United States Patent
Ang et al.

(10) Patent No.: US 10,104,616 B2
(45) Date of Patent: Oct. 16, 2018

(54) DOWNLINK MULTIPLEXING AND MAC SIGNALING FOR A SYSTEM WITH DEVICES OPERATING WITH AND WITHOUT LOW POWER COMPANION RECEIVERS

(71) Applicant: QUALCOMM Incorporated, San Diego, CA (US)

(72) Inventors: Peter Pui Lok Ang, San Diego, CA (US); Stephen Jay Shellhammer, Ramona, CA (US); Joseph Binamira Soriaga, San Diego, CA (US); Naga Bhushan, San Diego, CA (US); Tingfang Ji, San Diego, CA (US); Cong Nguyen, San Diego, CA (US); Joseph Patrick Burke, Glenview, IL (US); Wei Zeng, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/053,679

(22) Filed: Feb. 25, 2016

(65) Prior Publication Data
US 2016/0374022 A1 Dec. 22, 2016

Related U.S. Application Data

(60) Provisional application No. 62/183,035, filed on Jun. 22, 2015.

(51) Int. Cl.
*H04W 52/02* (2009.01)
*H04L 5/00* (2006.01)
*H04W 76/27* (2018.01)

(52) U.S. Cl.
CPC ....... *H04W 52/0235* (2013.01); *H04L 5/0007* (2013.01); *H04W 52/0216* (2013.01);
(Continued)

(58) Field of Classification Search
CPC ......... H04W 52/0209; H04W 52/0229; H04W 52/0225; H04W 52/0235
See application file for complete search history.

(56) References Cited

U.S. PATENT DOCUMENTS 7,496,059 B2   2/2009   Yoon et al.
7,650,135 B2   1/2010   Twitchell
(Continued)

OTHER PUBLICATIONS

International Search Report and Written Opinion—PCT/US2016/038065—ISA/EPO—Jul. 28, 2016.

*Primary Examiner* — Anh-Vu Ly
*Assistant Examiner* — Hector Reyes Ortiz
(74) *Attorney, Agent, or Firm* — Haynes and Boone, LLP

(57) ABSTRACT

Systems and methods are disclosed for enhancing the power efficiency of low power internet of everything (IOE) devices or user equipments (UEs). A UE or IOE having a low power companion receiver maintains its full power receiver in a sleep state until it receives a wake up indicator from a base station. In response to the wake up signal, the UE or IOE powers up its full power receiver and receives data from the base station. The base station further schedules the wake up signals so as not to collide with control signals expected by UEs or IOEs without low power receivers, or those UEs and IOEs are configured to detect and react to the wake up signals.

30 Claims, 12 Drawing Sheets

(52) U.S. Cl.
CPC ............ *H04W 76/27* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/24* (2018.01)

(56) References Cited

U.S. PATENT DOCUMENTS

| | | |
|---|---|---|
| 8,514,758 B2 | 8/2013 | De Kimpe et al. |
| 2012/0190390 A1 | 7/2012 | Reunamaki et al. |
| 2012/0275362 A1 | 11/2012 | Park et al. |
| 2014/0050133 A1 | 2/2014 | Jafarian et al. |
| 2014/0112225 A1* | 4/2014 | Jafarian ............ H04W 52/0235 370/311 |
| 2014/0112229 A1* | 4/2014 | Merlin ............. H04W 52/0209 370/311 |
| 2014/0126442 A1 | 5/2014 | Jafarian et al. |
| 2014/0185501 A1 | 7/2014 | Park et al. |
| 2016/0374021 A1* | 12/2016 | Alpman ............ H04W 52/0229 |

* cited by examiner

DOWNLINK MULTIPLEXING AND MAC SIGNALING FOR A SYSTEM WITH DEVICES OPERATING WITH AND WITHOUT LOW POWER COMPANION RECEIVERS

CROSS REFERENCE TO RELATED APPLICATIONS

The present application claims priority to and the benefit of the U.S. Provisional Patent Application No. 62/183,035, filed Jun. 22, 2015, which is hereby incorporated by reference in its entirety.

TECHNICAL FIELD

This application relates to wireless communications systems, and in particular to using low power companion receivers in wireless devices to minimize power use while waiting for data transmissions.

BACKGROUND

Wireless communication networks have traditionally functioned to allow general purpose devices such as cellular phones, PDAs, and laptops to transmit and receive information reliably and on demand. Currently, more and more devices with proprietary functions are being designed with internet connectivity in mind. These devices are known as "internet of everything" (IOE) devices. They can include, for example, household appliances, location beacons, or status monitors for remotely located facilities. Some IOE devices are designed to function for very long periods of time—weeks, months, or even years—on a battery, without access to another power source. In these applications there is a need for minimizing the power consumed by radio communications with the IOE device.

Conventional systems employ sleep cycles during which an IOE device's transceivers are powered down to save battery. The IOE device has an internally stored schedule that instructs the device to wake up its transceivers when the device is due to listen for potential data transmissions. Depending on the application, these wake up events can occur as frequently as once every second. However, a given IOE device will often have a data transmission waiting for it as little as 10% or less of the time. While turning transceivers on for a fraction of each second as compared to leaving them on constantly results in significant power savings, such systems are still expending power to run full power transceivers when 90% or more of the time there is no data waiting for them. It is therefore desirable to further economize by reducing the power used by the transceivers in data cycles where no data is transmitted to an IOE device.

In a system that includes IOE devices with low power transceivers, the base station needs to be configured to communicate with the low power transceivers, which may require a different signal configuration than normal power transceivers. In systems containing devices with low power transceivers as well as devices with normal power transceivers, it may become necessary to multiplex the downlink signal between the two types of devices. It is therefore desirable to design a protocol that ensures that the downlink signals can be appropriately received by both types of transceivers.

SUMMARY

In one aspect of the invention, a method of wireless communication includes transmitting, from a first wireless communication device, a wake-up paging indicator (WUPI) during a first transmission time interval (TTI), the WUPI indicating to a second wireless communication device to wake up and listen for a data signal from the first wireless communication device during a second TTI; and transmitting, from the first wireless communication device to the second wireless communication device, the data signal during the second TTI.

In an additional aspect of the invention, a method of wireless communication includes receiving, at a first wireless communication device from a second wireless communication device, a wake-up paging indicator (WUPI) during a first transmission time interval (TTI); waking up, at the first wireless communication device, in response to the WUPI; listening, at the first wireless communication device, for a data signal from the second wireless communication device during a second TTI; and receiving, at the first wireless communication device from the second wireless communication device, the data signal during the second TTI.

In an additional aspect of the invention, a method of wireless communication includes receiving, at a first wireless communication device from a second wireless communication device, a control signal during a transmission time interval (TTI) which provides to the first wireless communication device an allocation of channel resources to monitor for a nominal data signal; and monitoring, by the first wireless communication device, the allocated channel resources for the nominal data signal, wherein the allocation of channel resources is multiplexed between the first wireless communication device and a third wireless communication device.

In an additional aspect of the invention, a first wireless communication device includes a processor configured to generate a wake-up paging indicator (WUPI) and a data signal; and a transceiver configured to transmit the WUPI to a second wireless communication device during a first transmission time interval (TTI), the transceiver further configured to transmit the data signal to the second wireless communication device during a second TTI, wherein the WUPI indicates to the second wireless communication device to wake up and listen for the data signal.

In an additional aspect of the invention, a first wireless communication device includes a first receiver configured to receive a wake-up paging indicator (WUPI) from a second wireless communication device during a first transmission time interval (TTI); and a processor configured to detect the WUPI and wake up a second receiver in response to the WUPI, wherein the second receiver configured to receive a data signal during a second TTI.

In an additional aspect of the invention a first wireless communication device includes a receiver configured to receive from a second wireless communication device a control signal during a transmission time interval (TTI), the control signal providing to the first wireless communication device an allocation of channel resources to monitor for a nominal data signal, the receiver further configured to monitor the allocated channel resources for the nominal data signal, wherein the allocation of channel resources is multiplexed between the first wireless communication device and a third wireless communication device.

In an additional aspect of the invention, a computer-readable medium having program code recorded thereon includes code for causing a first wireless communication device to transmit to a second wireless communication device a wake-up paging indicator (WUPI) during a first transmission time interval (TTI), the WUPI indicating to the second wireless communication device to wake up and listen for a data signal from the first wireless communication device during a second TTI; and code for causing the first wireless communication device to transmit to the second wireless communication device the data signal during the second TTI.

In an additional aspect of the invention, a computer-readable medium having program code recorded thereon includes code for causing a first wireless communication device to receive from a second wireless communication device a wake-up paging indicator (WUPI) during a first transmission time interval (TTI); code for causing the first wireless communication device to wake up in response to the WUPI; code for causing the first wireless communication device to listen for a data signal from the second wireless communication device during a second TTI; and code for causing the first wireless communication device to receive from the second wireless communication device the data signal during the second TTI.

In an additional aspect of the invention, a computer-readable medium having program code recorded thereon includes code for causing a first wireless communication device to receive, during a transmission time interval (TTI), from a second wireless communication device, a control signal which provides to the first wireless communication device an allocation of channel resources to monitor for a nominal data signal; code for causing the first wireless communication device to monitor the allocated resources for the nominal data signal; and wherein the allocation of channel resources is multiplexed between the first wireless communication device and a third wireless communication device.

In an additional aspect of the invention, a first wireless communication device includes means for generating a wake-up paging indicator (WUPI) and a data signal; means for transmitting the WUPI to a second wireless communication device during a first transmission time interval (TTI); and means for transmitting the data signal to the second wireless communication device during a second TTI, wherein the WUPI indicates to the second wireless communication device to wake up and listen for the data signal.

In an additional aspect of the invention, a first wireless communication device includes means for receiving from a second wireless communication device a wake-up paging indicator (WUPI) during a first transmission time interval (TTI); means for waking up in response to the WUPI; means for listening for a data signal from the second wireless communication device during a second TTI; and means for receiving from the second wireless communication device the data signal during the second TTI.

In an additional aspect of the invention, a first wireless communication device includes means for receiving from a second wireless communication device a control signal during a transmission time interval (TTI) which provides to the first wireless communication device an allocation of channel resources to monitor for a nominal data signal; and means for monitoring the allocated channel resources for the nominal data signal, wherein the allocation of channel resources is multiplexed between the first wireless communication device and a third wireless communication device.

DETAILED DESCRIPTION

Figure 1:
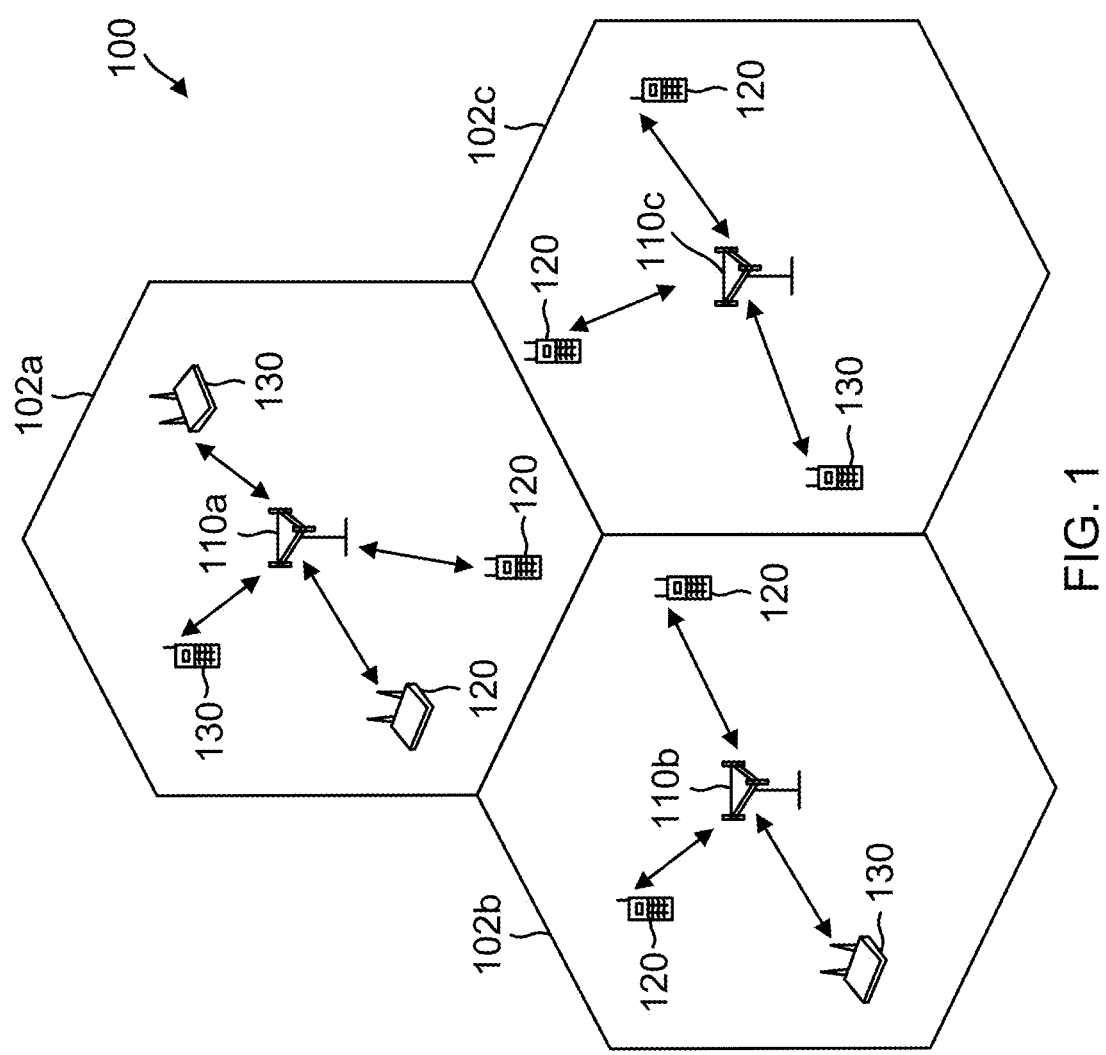
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network.

Embodiments of the present disclosure describe a system for increasing power efficiency of wireless communication devices such as "internet of everything" (IOE) devices with the use of low power companion receivers, and subsequently multiplexing the signals intended for the low power companion receivers with signals intended for nominal power receivers when the allocated resources for low-power signals are not needed or used. The low power companion receiver functions to reduce power consumption of the IOE device while waiting for an indication from a base station that data is incoming. While the low power companion receiver is active, the full (or nominal) power receiver of the IOE device is turned off (or asleep). The base station sends an indication that data is waiting via a wake-up signal. In response to the wake-up signal, the IOE device turns its nominal power receiver on and monitors for the expected data transmission.

The wake up signal for the low power companion receiver may be different from the normal (or nominal) control data used by the wireless protocol. Furthermore, the wake-up signal adds another type of data to be fit into already precious channel resources, and if the signal is different from nominal control data, there is a risk that some nominal wireless devices expecting to see nominal control data will instead see the wake-up signal and be confused. Embodiments of the present disclosure therefore assist to either schedule transmissions so that nominal devices do not see the wake-up signal, or to design the nominal devices so that they can detect and react to the wake-up signal.

In an embodiment, the base station may expressly inform nominal devices that subsequent transmission time intervals are going to be occupied with wake-up signaling, so that the nominal devices may ignore those transmission time intervals. In another embodiment, the base station may not expressly inform the nominal devices; instead, the nominal devices may infer the presence of wake-up signaling based on what it detects or does not detect at their receivers during the relevant time periods. In embodiments where the wake-up signaling does not require multiple transmission time intervals, the wake-up signal's scheduling may be included in a nominal control signal to the nominal devices and then the wake-up signal transmitted during the same transmission time interval. As a result, the resources in a downlink channel may be conditionally multiplexed between nominal/regular data and wake-up signaling (e.g., where an assigned block of resources for wake-up signaling in the downlink waveform are not utilized in a given transmission time interval, the base station may instead use the assigned block of resources to transmit nominal data).

In another embodiment, the base station may expressly allocate one or more wake-up signaling windows in the downlink. To do so, the base station may determine an estimated number of low-power devices that may require a wake-up signal at any given transmission time interval, and then allocate sufficient time (e.g., multiple transmission time intervals) to enable wake-up signals of a given symbol length to be transmitted to some subset of low-power devices during the wake-up signaling window. When the full extent of the wake-up signaling window is not necessary in a given window, the base station may retransmit whatever wake-up signaling was scheduled for the given wake-up window.

FIG. 1 illustrates a wireless communication network 100 in accordance with various aspects of the present disclosure. The wireless network 100 may include a number of base stations 110. A base station 110 may include an evolved Node B (eNodeB) in the LTE context, for example. A base station may also be referred to as a base transceiver station or an access point. For simplicity of discussion, it will be referred to herein as a base station. It will be recognized that there could be one to many base stations, as well as be an assortment of different types such as macro, pico, and/or femto base stations.

The base stations 110 communicate with user equipment (UEs) 120 and "internet of everything" (IOE) devices 130 as shown. Although illustrated and described as separate devices, as will be recognized an IOE device 130 may be a particular type of UE 120, and the separate discussion herein is for clarity of discussion only. IOE devices 130 may either be stand-alone or integrated within other devices. The IOE devices 130 may capture information that is then relayed to a remote system, such as via a base station 110. IOE devices 130 may have limited power resources because they are integrated with other devices or objects, such as to render those devices or objects "smart," and need to be able to operate for long periods of time without replacement or recharge, e.g. days, weeks, months, or years. Each of the IOE devices 130 may only awake at predefined time intervals according to a pre-determined schedule in order to decrease power consumption at the IOE devices 130.

To further assist in decreasing power consumption, according to embodiments of the present disclosure some IOE devices 130 may have low-power companion receivers in addition to full power (nominal) receivers. With these additional low-power companion receivers, these particular IOE devices 130 may further reduce power consumption when engaging in certain types of communication. One or more of the low-power companion receivers may be ultra-low power receivers, for example. These low-power companion receivers are also referred to as wake-up receivers. The low-power companion receiver may reduce power consumption of the associated IOE device 130 while listening for wake-up signaling. In some embodiments, upon receipt of a wake-up signal, an IOE device 130 wakes up its full power receiver to receive data signals, control signals, or the like.

For convenience, IOE devices 130 with low-power companion receivers will herein be referred to as LP IOEs 130 (low-power IOE devices 130). Some of the IOE devices 130 may lack low-power companion receivers. For the purposes of this disclosure, such IOE devices 130 function the same as UEs 120 with respect to signaling/messaging targeted for low-power companion receivers, and for simplicity of discussion herein these IOE devices 130 and UEs 120 will be jointly referred to as nominal UEs 120.

As shown in FIG. 1, base station 110a may communication with the nominal UEs 120 and LP IOEs 130 that are within the cell 102a, the base station 110b may communicate with the nominal UEs 120 and LP IOEs 130 within the cell 102b, and the base station 102c may communicate with the nominal UEs 120 and LP IOEs 130 within the cell 102c. A nominal UE 120 or LP IOE 130 may communicate with a base station 110 via an uplink and a downlink. The downlink (or forward link) refers to the communication link from a base station 110 to a nominal UE 120 and/or LP IOE 130. The uplink (or reverse link) refers to the communication link from a nominal UE 120 and/or LP IOE 130 to a base station 110. It will be recognized that the devices communicating with a given base station 110 may include a mix of both LP IOEs 130 as well as other types of UEs 120 such as mobile phones or other types of mobile computers.

The nominal UEs 120 and LP IOEs 130 may be dispersed throughout the wireless network 100, and each nominal UE 120 and/or LP IOE 130 may be stationary or mobile. A UE may also be referred to as a terminal, a mobile station, a subscriber unit, etc. A nominal UE 120 may be a cellular phone, a smartphone, a personal digital assistant, a wireless modem, a laptop computer, a tablet computer, etc., to name just a few examples. Some particular examples of an LP IOE 130 may be a GPS location beacon, an implanted heartrate monitor, etc. The wireless communication network 100 is one example of a network to which various aspects of the disclosure apply.

LP IOEs 130 may rely upon their full power receivers in order to receive data from a base station 110. However, according to embodiments of the present disclosure, the LP IOEs 130 may maintain their full power receivers in a sleep (or deep sleep) mode for significant periods of time (e.g., during periods where the base station 110 has indicated they may sleep and/or where the LP IOEs 130 determine that downlink signals are not targeted to them). Accordingly, the base station 110 may send a "wake-up paging indicator" (WUPI), also referred to as a wake-up signal, to the LP IOE 130 to instruct it to wake up its full power receiver. Nominal UEs 120 may not have a use for a WUPI. It is therefore becomes advantageous to multiplex communications between LP IOEs 130 and nominal UEs 120 to ensure that the nominal UEs 120 properly respond in the presence of the WUPI (e.g., to make sure that nominal UEs 120 are ready to receive data as it becomes available to them while disregarding activity associated with the WUPI).

Embodiments of this disclosure are directed to any type of modulation scheme, but orthogonal frequency division multiplexing (OFDM) is used as a representative modulation for regular data transmissions in the downlink to nominal UEs 120 and LP IOEs 130. OFDM is a multi-carrier modulation technique that effectively partitions the overall system bandwidth into multiple (K) orthogonal frequency subbands. These subbands may also be referred to as tones, subcarriers, bins, and frequency channels. With OFDM, each subband is associated with a respective subcarrier that may be modulated with data. Up to K modulation symbols may be sent on the K subbands in each OFDM symbol period.

According to aspects of the present disclosure, the base stations 110*a*-110*c* may embed synchronization and/or WUPI signaling into OFDM downlink signaling so that separate, dedicated transmission hardware is not necessary at the base stations 110*a*-110*c*. A synchronization signal may be a symbol known to both the transmitter and all listening receivers (e.g., LP IOEs 130 and UEs 120) and transmitted using a selected subcarrier (or subband). A WUPI may be a symbol known to both the transmitter and an LP IOE 130, where each LP IOE 130 may have a particular symbol assigned to it (whether unique to it or shared with other devices for the same purpose in different frequency/time combinations). For an OFDM waveform with K subbands, any number and configuration of subbands may be used for synchronization and/or WUPIs. For example, a selected subcarrier may be used for synchronization signals, the same and/or other subcarriers for WUPIs, and the remaining subcarriers for transmitting data symbols or control symbols on some or all of the remaining subcarriers (or the remaining subcarriers may not be used at all at times). These synchronization signals and WUPIs may be modulated using a different modulation than the modulation used for data/control symbols on any of the other subcarriers.

The transmission and signaling techniques described herein may be used for a multiple-input multiple-output (MIMO) system. These techniques may be used for an OFDM-based system and for other multi-carrier communication systems. These techniques may also be used with various OFDM subband structures.

For purposes of the following discussion, the base station 110*a* in cell 102*a* will be used as an example. The base station 110*a* may periodically send synchronization signals to the LP IOEs 130 that are within the cell 102*a*. These synchronization signals are used to enable at least the LP IOEs 130 to periodically synchronize their local clocks with the clock of the base station 110*a*. This often becomes necessary because the clocks of the LP IOEs 130 may be less accurate due to the low power demands imposed on the LP IOEs 130. Thus, over time the clocks for the LP IOEs 130 may drift relative to the clock of the base station 110*a*, which tends to be more accurate and stable. Due to the drift, an offset arises between the time at which a receiver of a given LP IOE 130 wakes up to listen for a signal from the base station 110*a* and the time at which the receiver of the given LP IOE 130 actually receives the signal from the base station 110*a*. If the drift becomes large enough, then the given LP IOE 130 will no longer be able to decode the signal received from the base station 110*a*. The synchronization signal provides the information necessary for the LP IOEs 130 (and, in some embodiments, the UEs 120 as well) to re-synchronize to the base station 110*a* clock.

The synchronization signal may be periodically sent for example at pre-specified time intervals that the LP IOEs 130 are made aware of. For example, this may be established at a time of initial setup such as when an LP IOE 130 attaches to the network via the base station 110*a*. Alternatively, or in addition, the base station 110*a* may establish the periodicity of the synchronization signal, as well as what frequency and time at which the synchronization signal will be transmitted, with a command sent to the LP IOEs 130 to place them into sleep mode. The synchronization signal may be embedded within an OFDM downlink waveform that includes other information (such as data or control information) for one or more other UEs 120. The synchronization signal may be broadcast to all LP IOEs 130 within range of the OFDM downlink waveform and be modulated according to a different modulation scheme than that used for rest of the OFDM downlink waveform. The LP IOEs 130 within the cell 102*a* may wake up their low-power companion receivers at the pre-specified times that the synchronization signal is broadcast to re-sync to the clock of the base station 110*a*, as described above.

According to further embodiments of the present disclosure, each LP IOE 130 within the cell 102*a* may be assigned a particular set of resources (e.g., frequency subcarrier(s) and time slot(s)) at which they are to use their wake-up receivers to monitor for a WUPI from the base station 110*a*. The base station 110*a* may establish the frequency and time resource elements, as well as the periodicity, at which the WUPI will be transmitted with a command sent to the LP IOEs 130 to place them into sleep mode. In an embodiment, the base station 110*a* assigns each LP IOE 130 within the cell 102*a* a different time slot and/or frequency subcarrier at which to wake up to listen for a WUPI. Where each LP IOE 130 listens at a unique frequency subcarrier and/or time slot, the base station 110*a* may use the same sequence (e.g., a pseudo random noise sequence) as the signal that is modulated for both the synchronization signal and for each WUPI to each LP IOE 130. In an alternative embodiment, two or more LP IOEs 130 within the cell 102*a* may be assigned to the same frequency and/or time slot. In this embodiment, the base station 110*a* may use a different sequence for each LP IOE 130 that shares the same frequency and/or time slot so that each LP IOE 130 is able to discern whether the WUPI is intended for them.

The base station 110*a* may further multiplex between transmitting WUPIs and nominal data. This multiplexing is useful, for example, since not every scheduled resource element combination may actually be utilized at any given time to transmit a WUPI, since the WUPI is used to notify one or more LP IOEs 130 to wake up to transmit or receive nominal data via their primary receivers. There are several different ways in which the base station 110*a* may multiplex between WUPI and nominal data, as will be discussed further below with respect to the remaining figures.

Figure 2:
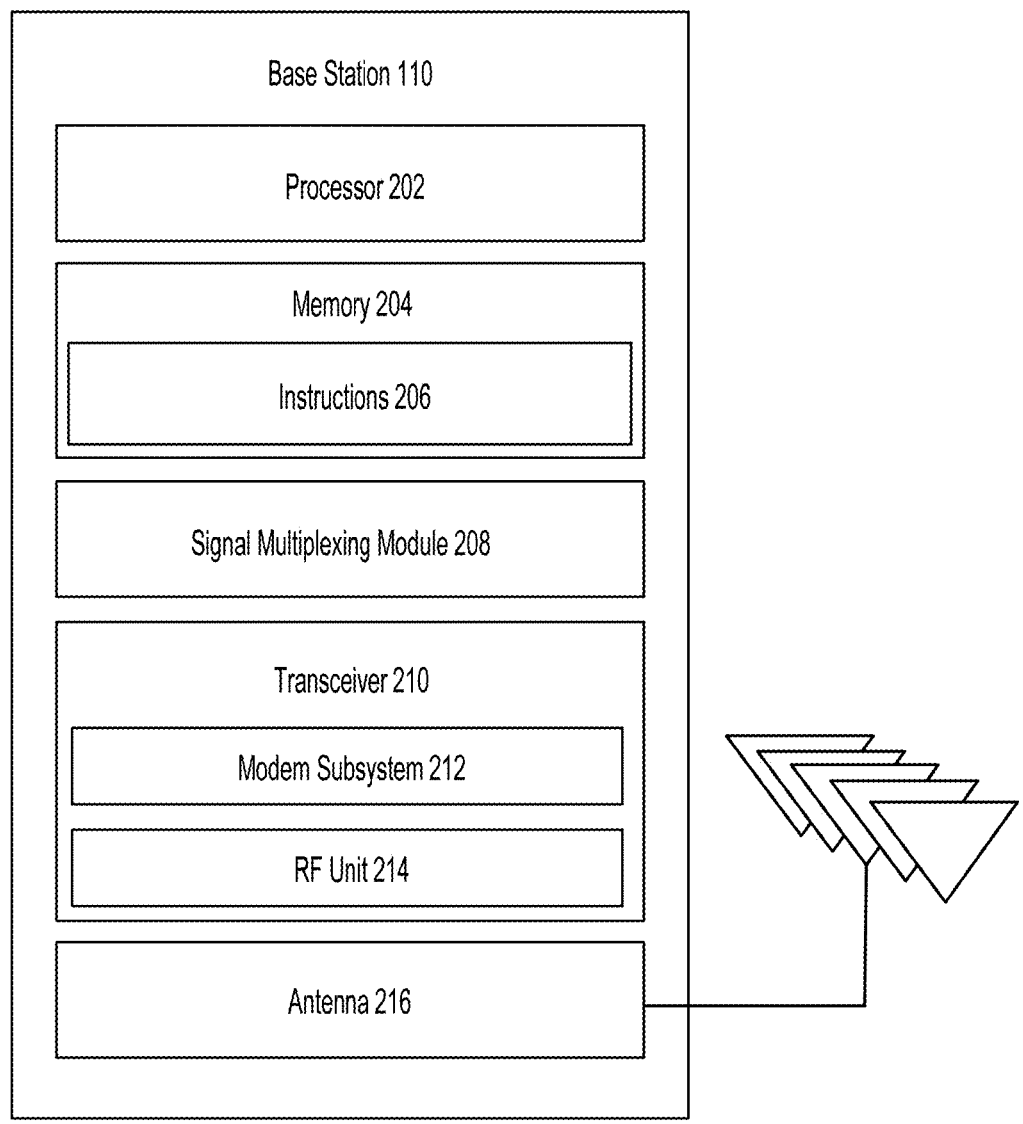
FIG. 2 is a block diagram illustrating an exemplary base station in accordance with various aspects of the present disclosure.

FIG. 2 is a block diagram of an exemplary base station 110 according to embodiments of the present disclosure. The base station 110 may include a processor 202, a memory 204, a signal multiplexing module 208, a transceiver 210, and an antenna 216. These elements may be in direct or indirect communication with each other, for example via one or more buses. As mentioned above with respect to FIG. 1, the base station 110 may communicate with multiple UEs 120 and/or LP IOEs 130.

The processor 202 may include a CPU, a DSP, an ASIC, a controller, a FPGA device, another hardware device, a firmware device, or any combination thereof configured to perform the operations described herein with reference to the base station 110 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the base station 110 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The signal multiplexing module 208 of the base station 110 may be used for various aspects of the present disclosure. For example, the signal multiplexing module 208 may manage frequency and time resource element assignment/tracking for the UEs 120 and the LP IOEs 130 that are attached to the network through the base station 110 or are otherwise within range. This may be kept within a database on the base station 110, for example. The signal multiplexing module 208 may include information in a sleep mode message to LP IOEs 130 that identifies the assigned time and frequency resource elements that each LP IOE 130 has been assigned for WUPIs and synchronization signals, as well as a periodicity at which the WUPI and synchronization signals will be transmitted from the base station 110.

The signal multiplexing module 208 may further manage the multiplexing of one or more channel resources within an OFDM downlink waveform between control signaling for nominal UEs 120 and synchronization/WUPI signaling for LP IOEs 130. For example, in one embodiment the signal multiplexing module 208 may reuse a channel resource assigned for WUPI signaling for regular data (also referred to herein as "nominal data," or data directed towards nominal devices that do not have/use a low-power companion receiver) toward one or more nominal UEs 120. Such reuse opportunities may occur because the probability that the base station 110 needs to transmit a WUPI for any given LP IOE 130 (e.g., because there is data waiting to be transmitted to or requested from the LP IOE 130) is at times low. The signal multiplexing module 208 may conditionally multiplex between WUPI and nominal data—the condition being whether a WUPI needs to be sent at a given time or not. The same channel resource(s) may be reused at times where WUPI is not present according to a variety of embodiments.

In an embodiment, the signal multiplexing module 208 may not explicitly instruct listening nominal UEs 120 when a WUPI is or is not present. Instead, the listening nominal UEs 120 (when not in DRX (discontinuous reception) mode, nominal UEs 120 are supposed to decode the control channel, e.g. PDCCH) may detect a WUPI with a nominal transceiver. Based upon this detection, the nominal UEs 120 may determine that the current transmission time interval (TTI) is occupied by a WUPI intended for other devices (e.g., LP IOEs 130). The nominal UEs 120 may further confirm this by attempting to decode PDCCH—if unsuccessful, then the received signal is determined to be a WUPI. As a result, the nominal UEs 120 may enter a microsleep until the next TTI, when the nominal UEs 120 may listen again for nominal control data. Alternatively, the signal multiplexing module 208 may include in the WUPI messages some indication of the length of the WUPI, which listening nominal UEs 120 may obtain and, in response enter a sleep mode for the indicated duration. Further, under either alternative the nominal UEs 120 are prepared to expect this multiplexing behavior between nominal data and wake up signaling, and therefore do not interpret receipt of the WUPI as a radio link failure.

In an alternative embodiment for conditional multiplexing, the signal multiplexing module 208 may, when scheduling a WUPI to be transmitted, stop the base station 110 from transmitting PDCCH. Further, the nominal UEs 120 may not even attempt to detect the WUPI waveform when it is transmitted. Thus, if the TTI is occupied by a WUPI and the nominal UEs 120 are not able to decode it (e.g., because PDCCH was not transmitted), then the nominal UEs 120 may identify this as a radio link failure. The behavior of the nominal UE 120 when radio link failure occurs is, therefore, designed to allow the nominal UEs 120 to recover reliably and continue monitoring for nominal control data in the next TTI.

In another embodiment, the signal multiplexing module 208 may facilitate conditional multiplexing by causing the base station 110 to transmit a control signal to one or more nominal UEs 120 in a first TTI informing the nominal UEs 120 that, for the next N TTIs, a WUPI will be transmitted. In response, the listening nominal UEs 120 may skip the affected PDCCHs (e.g., by temporarily placing components to sleep until the TTIs are through).

Figure 4:
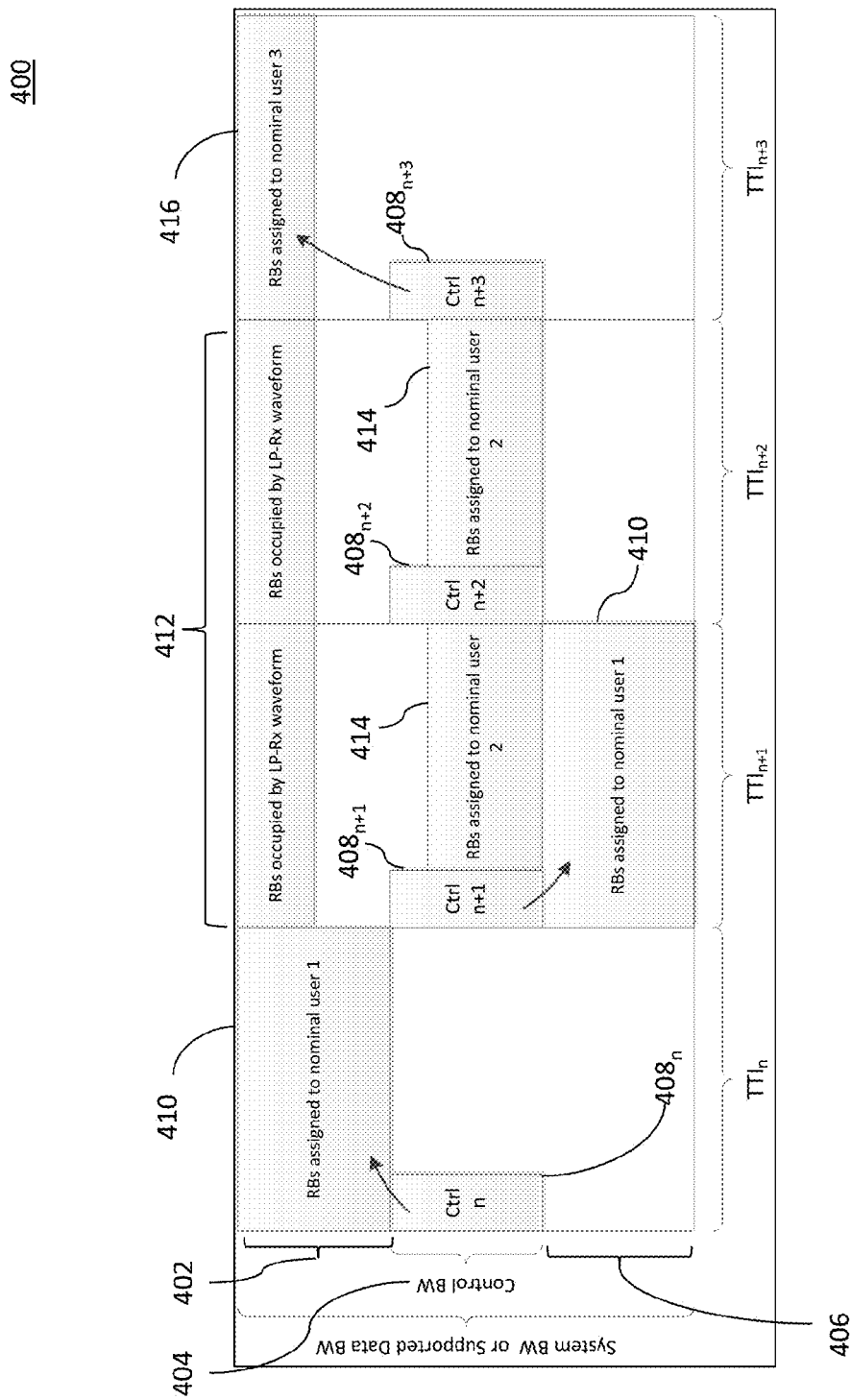
FIG. 4 is an illustration of channel resource allocation in accordance with various aspects of the present disclosure.

According to this embodiment, different approaches may be taken depending upon whether a given WUPI occupies more than one TTI or not. A WUPI occupying more than one TTI is illustrated in FIG. 4. FIG. 4 illustrates a diagram 400 of channel resource allocation where a WUPI occupies at least two TTIs. FIG. 4 illustrates four generic TTIs for purposes of simplicity of illustration. As will be recognized, more or fewer TTIs may actually be involved.

The frequency resources, otherwise referred to as the system bandwidth or supported data bandwidth, may be subdivided into three general bands—a first frequency band 402, a second (control) frequency band 404, and a third frequency band 406. These frequency bands may also be referred to as radio bands (RB). In FIG. 4, the second frequency band 404 is used as a control channel for at least nominal UEs 120 throughout the various TTIs. In $TTI_n$, no WUPI is scheduled to be sent or is sent. As a result, a block 410 of time and frequency spanning the first frequency band 402 normally used for WUPI may be allocated to a first nominal UE 120 and therefore represent a nominal data frame. Further with respect to $TTI_n$, control data $408_n$ occupies the second frequency band 404.

In the $TTI_{n+1}$, a WUPI 412 is present. As illustrated, the WUPI 412 occupies two TTIs. This is for illustration only, as it will be recognized that a WUPI could occupy more TTIs than two, e.g. where a large symbol length is used. In the $TTI_{n+1}$, the WUPI 412 is assigned to occupy at least a portion of the first frequency band 1102. The control data $408_{n+1}$ still occupies the second frequency band 404, albeit in this TTI a portion of the second frequency band 404 is subsequently shared with a block 414 of time that is assigned to a second nominal UE 120. The data block 410 assigned to the first nominal UE 120 is, in $TTI_{n+1}$, now assigned to the third frequency band 406 because of the presence of the WUPI 412.

As illustrated in FIG. 4, the WUPI 412 spans into the next TTI, $TTI_{n+2}$ in the same first frequency band 402. The control data $408_{n+2}$ as well as $408_{n+3}$ still occupy the same second frequency band 404. In $TTI_{n+3}$, the WUPI 412 has finished and another WUPI is not occupying the first frequency band 402. As a result, the base station 110 includes in the control data $408_{n+3}$ information that allocates the first frequency band in $TTI_{n+3}$ for the block 416 to a third nominal UE 120.

As can be seen, the WUPI waveform in FIG. 4 is restricted to RBs which do not collide with control-carrying tones (e.g., tones that carry PDCCH to nominal UEs 120) and aggregated in the same bandwidth (e.g., 1 MHz). Further, the bandwidth used for transmitting the WUPI waveform is reused in available TTIs for nominal data when a WUPI is not occupying the band. Puncturing is avoided by scheduling the control data and the WUPI in separate channel resources.

Figure 5:
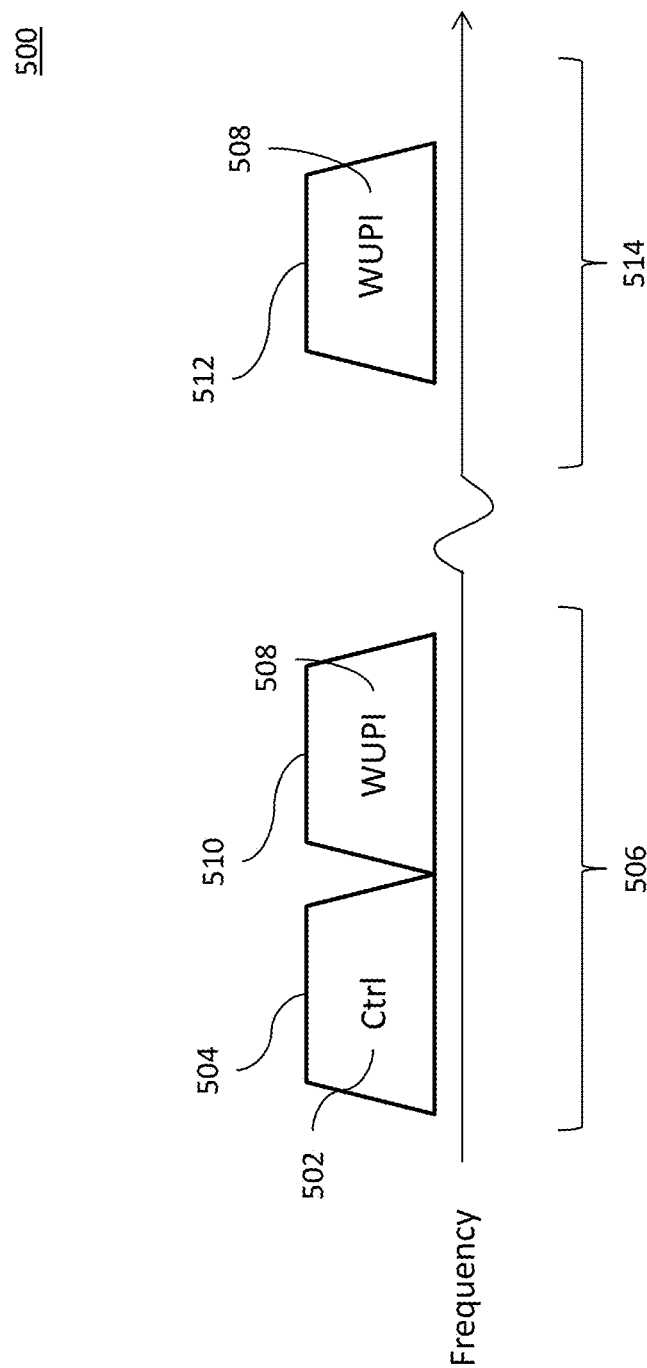
FIG. 5 is an illustration of component carrier allocation in accordance with various aspects of the present disclosure.

As an alternative to FIG. 4, WUPIs that are greater than one TTI may instead be allocated across various bands of frequency according to the principles of carrier aggregation, as illustrated in FIG. 5, which illustrates a diagram 500 exemplifying the aggregation of component frequency carriers. As illustrated in FIG. 5, the control data 502 is carried on component carrier 504 within the frequency band 506. The WUPI 508 is carried on multiple component carriers such that one subset of WUPI 508 is carried on component carrier 510, which is also within the frequency band 506, while another subset of WUPI 508 is carried on component carrier 512, which is on a separate frequency band 514. As a result, and for similar reasons as mentioned above with respect to FIG. 4, no collision or puncturing of the control data may occur by the WUPI.

Figure 6:
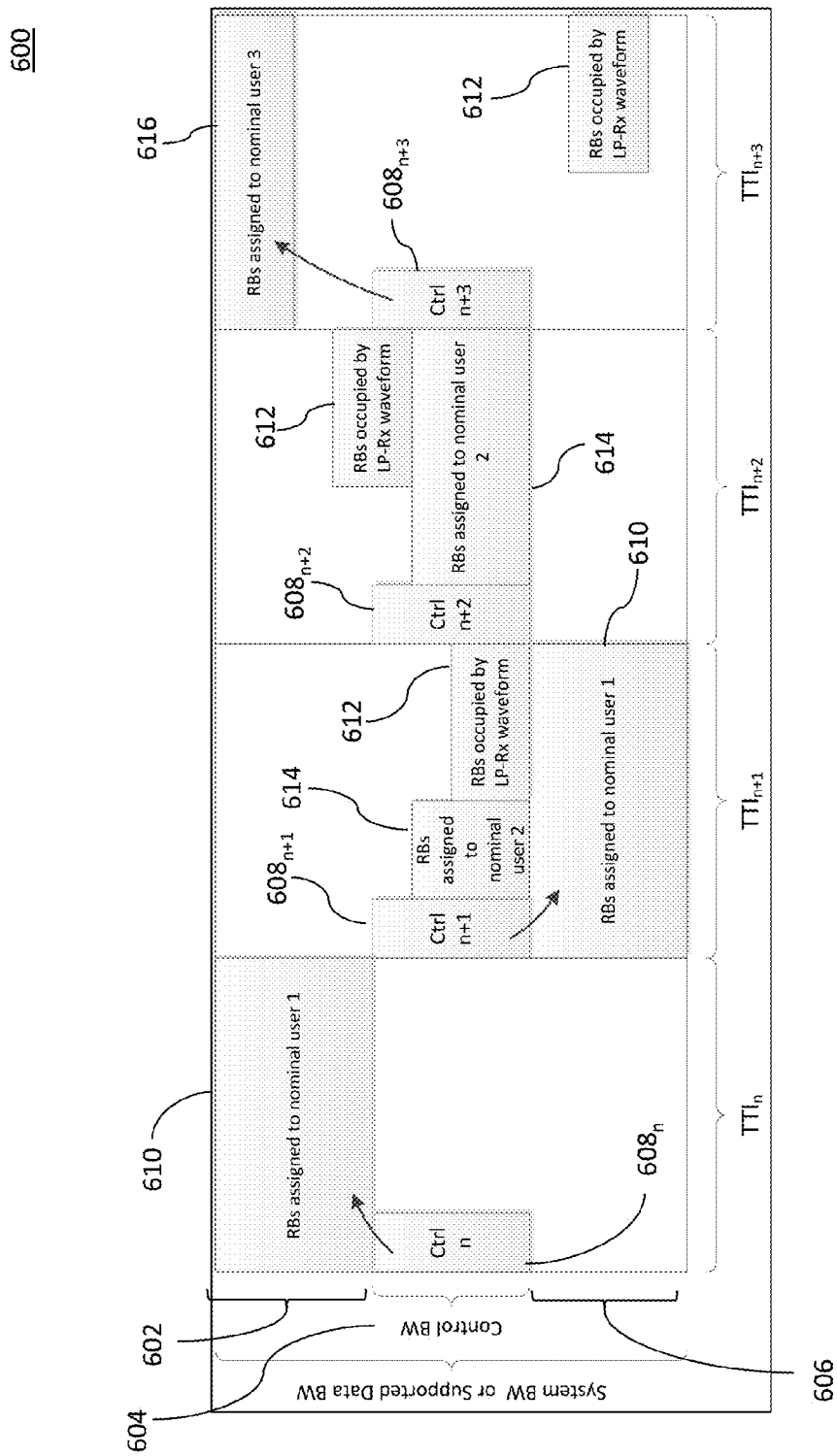
FIG. 6 is an illustration of channel resource allocation in accordance with various aspects of the present disclosure.

Conditional multiplexing may also occur in situations where the WUPI may occupy just one TTI or portion of a single TTI. This is illustrated in FIG. 6, which illustrates a diagram 600 of channel resource allocation over consecutive transmission time intervals. Like FIG. 4, the system bandwidth/supported data bandwidth is divided into three frequency bands including a first frequency band 602, a second frequency (control) band 604, and a third frequency band 606.

In $TTI_n$, no WUPI is scheduled to be sent or is sent. As a result, a block 610 of time and frequency spanning the first frequency band 602 normally used for WUPI may be allocated to a first nominal UE 120 and therefore represent a nominal data frame. Further with respect to $TTI_n$, control data $608_n$ occupies the second frequency band 604. The base station 110 may instruct the first nominal UE 120 of the allocation of the first frequency band 602 by way of the control data $608_n$.

In the $TTI_{n+1}$, a WUPI 612 is present. As illustrated, the WUPI 612 occupies less than the full $TTI_{n+1}$. As further illustrated, the WUPI 612 shares the second frequency band 602 (e.g., at least a portion thereof) with the control data $608_{n+1}$ as well as a block 614 assigned to a second nominal UE 120, all occupying different time portions of the $TTI_{n+1}$. As illustrated, the data block 610 assigned to the first nominal UE 120 is, in $TTI_{n+1}$, now assigned to the third frequency band 606.

During $TTI_{n+2}$ the WUPI 612 is scheduled to share just part of the control bandwidth 604 with both the nominal control data $608_{n+2}$ and the nominal data 614, while also using part of the bandwidth of first frequency band 602. In $TTI_{n+3}$, the WUPI 612 is scheduled to occupy subbands in the third frequency band 606 so that there is no overlap with the control data $608_{n+3}$. The base station 110 may allocate a portion of the first frequency band 602 for data block 616 allocated to a third nominal UE 120. This allocation may be conveyed to the third nominal UE 120 by way of the control data $608_{n+3}$.

In each of the above TTIs, according to an embodiment of the present disclosure the scheduling for the WUPI 612 is handled in the nominal control data 608. As a result, puncturing of the nominal control data 608 is avoided. In an alternative embodiment, the WUPI 612 may be handled as a puncturing of the given TTI by a higher priority, shorter TTI. This may occur for example, with the WUPI 612 being treated as a mission critical user. A benefit of this alternative approach may be the reduction in scheduling latency for a WUPI.

Returning to FIG. 2, in another embodiment the signal multiplexing module 208 may, instead of conditionally multiplexing between WUPI and nominal data, designate one or more WUPI windows. In some embodiments, the signal multiplexing module 208 allocates a dedicated time window of one or multiple TTIs for transmission of all necessary WUPIs (a WUPI window) to all LP IOEs 130 for which data transmission is scheduled. This is feasible, for example, when the data cycle is long and latency requirements for waking up LP IOEs 130 are lax. The signal multiplexing module 208 may cause the base station 110 to inform the nominal UEs 120 of the WUPI window, and in response the nominal UEs 120 may sleep for the duration of the WUPI window in every data cycle, avoiding the need to dynamically multiplex between nominal control data and WUPIs. Within the WUPI window, multiplexing between LP IOEs 130 may be achieved by assigning each LP IOE 130 a unique code in a coding scheme. For example, each LP IOE 130 may be assigned a unique Walsh code. The length of the WUPI window may be a multiple of the code symbol length. Each code-symbol-length period of time in the WUPI window corresponds to an opportunity for the base station 110 to send a WUPI (a WUPI opportunity).

Figure 7:
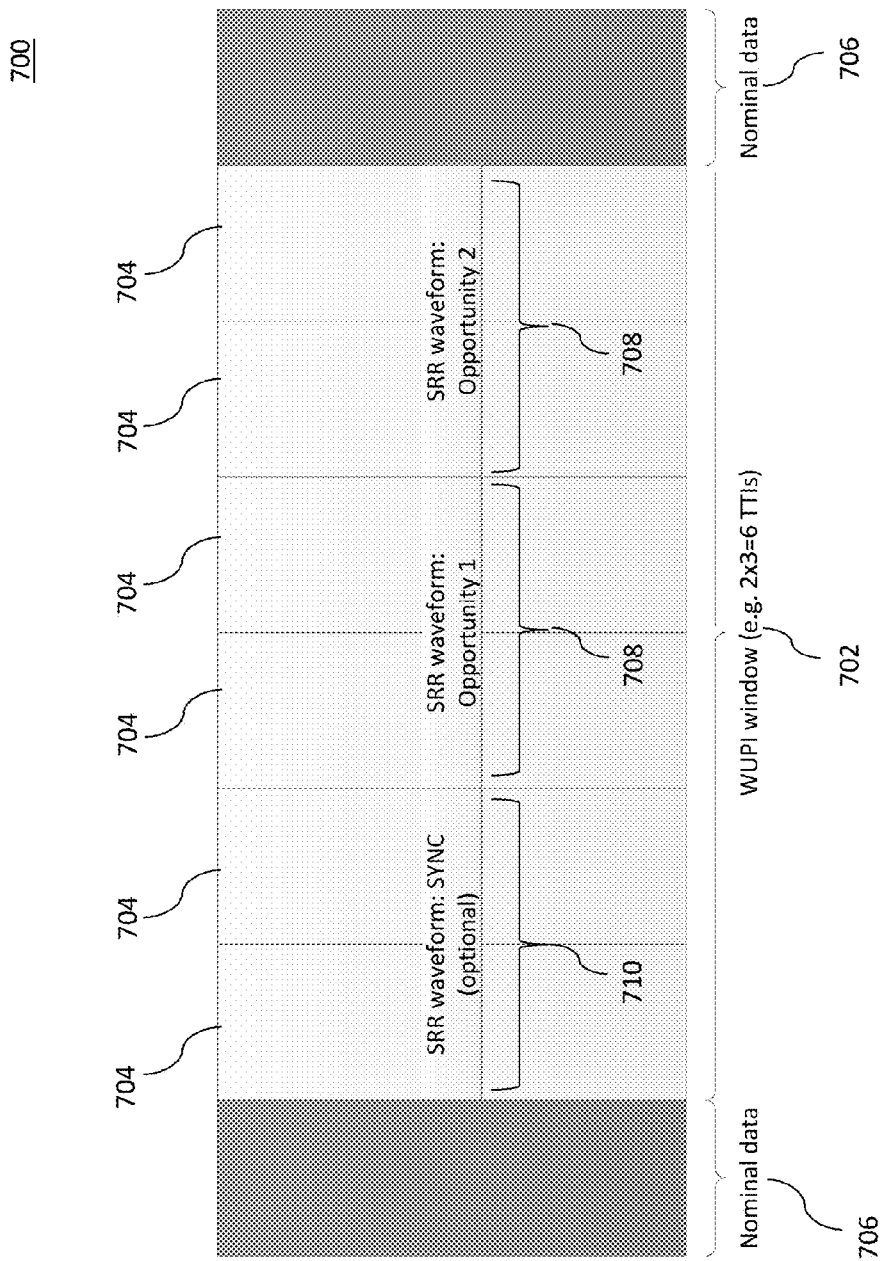
FIG. 7 is an illustration of WUPI window time frame scheduling in accordance with various aspects of the present disclosure.

This alternative embodiment is illustrated in FIG. 7, which shows a diagram 700 of a WUPI window. As illustrated in FIG. 7, the WUPI window 702 consists of 6 TTIs 704, which are surrounded in adjacent frequency bands by nominal data 706. As will be recognized, the number of TTIs, bands, and windows are illustrative only and other sizes are possible. In an embodiment, the WUPI window 702 may be composed of multiple symbol periods, such as 32 symbols, where each symbol period is a WUPI opportunity 708. In the example of FIG. 7, the symbol length of the WUPI code imposes a requirement of 2 TTIs per WUPI. Thus, in the illustrated WUPI window 702 three WUPI opportunities 708 are available.

In an embodiment, one or more of the WUPI opportunities may be used to transmit a synchronization signal 710, while the remaining opportunities 708 may be used for WUPIs.

Returning again to FIG. 2, the transceiver 210 may include a modem subsystem 212 and a radio frequency (RF) unit 214. The transceiver 210 is configured to communicate bi-directionally with other devices, such as one or more UEs 120 and LP IOEs 130. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The signal multiplexing module 208 may instruct the modem subsystem 212 of the transceiver 210 to modulate the embedded signal (synchronization or WUPI) with a modulation that is different than the modulation used for the data/control signaling in the rest of the OFDM downlink waveform. For example, the synchronization or WUPI may be modulated by elements of the modem subsystem 212 by some form of amplitude modulation, such as on-off keying (OOK), while the other data/control signaling is modulated according to another form of modulation, for example quadrature amplitude modulation (QAM). OOK may be selected since a number of low-power companion receivers detect the envelope of the signal and hence can demodulate OOK. Other possible modulations that may be used for the synchronization/WUPIs are binary phase shift keying (BPSK) and binary frequency shift keying (FSK). Binary modulation may be selected for the synchronization signal/WUPI because it is easier for the low-power companion receivers at the LP IOEs 130 to decode the signals at low signal-to-noise ratio (SNR). Where higher SNR is available, other higher-order modulation schemes may instead be used, for example amplitude shift keying (ASK) (which can be decoded with an envelope detection type wake-up receiver), or quadrature phase shift keying (QPSK) or higher order FSK at higher SNR.

The RF unit 214 may be configured to process (e.g., perform analog to digital conversion or digital to analog conversion, etc.) modulated/encoded data from the modem subsystem 212 (on outbound transmissions) or transmissions originating from another source such as a UE 120 or LP IOE 130. Although shown as integrated together in transceiver 210, the modem subsystem 212 and the RF unit 214 may be separate devices that are coupled together at the base station 110 to enable the base station 110 to communicate with other devices.

The RF unit 214 may provide the modulated and/or processed data, e.g. data packets, to the antenna 216 for transmission to one or more other devices such as UEs 120 and LP IOEs 130. After the transceiver 210 receives the OFDM information with the synchronization and/or WUPIs embedded within it from the signal multiplexing module 208, the modem subsystem 212 may modulate and/or encode the identifying information in preparation for transmission. The RF unit 214 may receive the modulated and/or encoded data packet and process the data packet prior to passing it on to the antenna 216. This may include, for example, transmission of data messages to one or more UEs 120 including one or more LP IOEs 130 according to embodiments of the present disclosure. The antenna 216 may further receive data messages transmitted from a UE 120 and/or LP IOE 130, and provide the received data messages for processing and/or demodulation at the transceiver 210. As illustrated, the antenna 216 may include multiple antennas of similar or different designs in order to sustain multiple transmission links.

Figure 3:
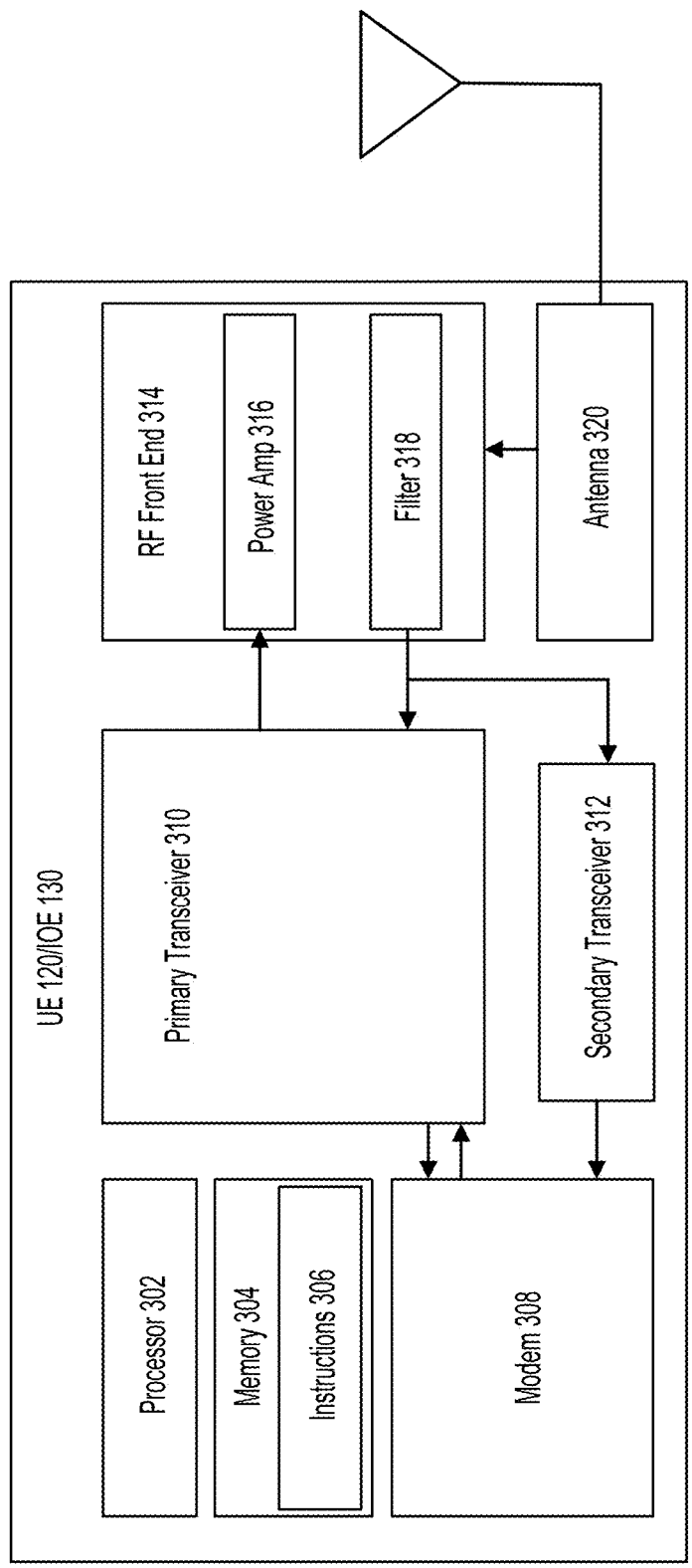
FIG. 3 is a block diagram illustrating an exemplary low power user equipment or internet of everything device in accordance with various aspects of the present disclosure.

FIG. 3 is a block diagram of an exemplary LP IOE 130 according to embodiments of the present disclosure. For simplicity of discussion, FIG. 3 will be described with respect to an LP IOE 130 as a specific example of a UE 120. The LP IOE 130 may include a processor 302, a memory 304, a modem 308, a primary transceiver 310, a secondary transceiver 312, an RF front end 314, and an antenna 320. These elements may be in direct or indirect communication with each other, for example via one or more buses. As mentioned above with respect to FIG. 1, the LP IOE 130 may communicate with a base station 110 that is within range.

The processor 302 may include a CPU, a DSP, an ASIC, a controller, a FPGA device, another hardware device, a firmware device, or any combination thereof configured to perform the operations described herein with reference to the LP IOE 130 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the LP IOE 130 in connection with embodiments of the present disclosure. Instructions 306 may also be referred to as code, which may be interpreted broadly to include any type of computer-readable statement(s) as discussed above with respect to FIG. 2.

The modem subsystem 308 may be configured to modulate and/or encode data according to a modulation and coding scheme (MCS), e.g., a low-density parity check (LDPC) coding scheme, a turbo coding scheme, a convolutional coding scheme, etc.

The primary transceiver 310 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as a UE 120 or LP IOE 130. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The secondary transceiver 312 may be a low power companion receiver (or wake-up receiver) that may wake up at pre-specified times in order to listen for synchronization signals and WUPIs. The secondary transceiver 312 may include an envelope detector to detect the specific modulation of the synchronization signals/WUPIs from the base station 110 (e.g., a binary modulation), which may be selected to be easier for the secondary transceiver 312 at the LP IOE 130 to decode the signals at low signal-to-noise ratio (SNR). The secondary transceiver 312 may further compare a demodulated, decoded signal (either synchronization signals or WUPIs) to a previously shared and stored sequence. The previously shared and stored sequence may either be stored in a memory local to the secondary transceiver 312, or in the memory 304. For the synchronization signal, this involves comparing the received signal to the previously stored sequence to determine what local clock adjustment may be necessary to realign the clock of the LP IOE 130 to the clock of the base station 110. For the WUPI, this involves comparing the received signal to the previously stored sequence (which may or may not be the same sequence as for the synchronization signal) to determine whether the received signal is a wake-up message from the base station 110.

The RF front end 314 may include a filter 318, which may be for example a band-pass filter to filter out-of-band signals. The RF front end 314 may also include an impedance matching circuit and an amplifier 316. Although illustrated as separate, as will be recognized some aspects described above with respect to the primary transceiver 310 may be performed by the RF front end 314 (e.g., upconversion, downconversion, and mixing) and vice versa. The RF front end 314 may provide the modulated and/or processed data, e.g. data packets, to the antenna 320 for transmission to the base station 110. In some embodiments, LP IOE 130 has a second RF front end that is power optimized for the secondary transceiver 312.

The antenna 320 may include one or multiple antennas of similar or different designs in order to sustain a single or multiple transmission links, respectively. The antenna 320 of the LP IOE 130 may transmit data provided from the primary transceiver 310 after modulation and coding from the modem subsystem 308 and amplification at the RF front end 314. The antenna 320 of the LP IOE 130 may also receive data from multiple sources, including from a base station 110. The antenna 320 may feed the received data to the RF front end 314. Although FIG. 3 illustrates the primary and secondary transceivers 310, 312 sharing the same antenna 320, it will be recognized that the LP IOE 130 may alternatively include separate antenna 320 for each transceiver type.

When data received from the antenna 320 is filtered by the filter 318, the received signal is input to the primary transceiver 310 when in regular operation. Alternatively, when the primary transceiver 310 is placed in a low-power sleep mode (e.g., a very low-power sleep mode), the received signal may be input to the secondary transceiver 312. The secondary transceiver 312 may then analyze the received information during the periods that it wakes up to either receive and process a synchronization signal or determine whether a WUPI has been received. If a WUPI has been received, the secondary transceiver 312 may wake up the primary transceiver 310 (and, in some embodiments, the rest of the components of the device 130) so that desired operations may be performed, such as receipt of data at the LP IOE 130 or transmission of collected data to the base station 110.

In an exemplary embodiment, the LP IOE 130 may wake up at a first, pre-specified time in order to listen for a synchronization signal. The LP IOE 130 may correlate the signal to a stored code for the synchronization signal and, based on this comparison, correct a clock offset local to the LP IOE 130 (which may be less accurate due to the low-power nature of the device) to be time aligned with the clock of the base station 110 (which may be more accurate).

In a further exemplary embodiment, the LP IOE 130 may wake up at a second, pre-specified time in order to listen for a WUPI from the base station 110. As the antenna 320 picks up information from the environment, the secondary transceiver 312 compares the information to a stored code for the assigned WUPI. If the correlation value is less than (or less than/equal to) a pre-determined threshold correlation value, then the secondary transceiver 312 may determine that a WUPI was not received. This may mean that no WUPI was transmitted at all from the base station 110, or this may mean that a signal was transmitted but was intended for another LP IOE 130 (and, therefore, had a sequence that substantially did not match the stored sequence at the particular LP IOE 130). As a result, the secondary transceiver 312 goes back to sleep until the next pre-determined time interval.

If the correlation value is greater (or greater than/equal to) than the pre-determined threshold, then the secondary transceiver 312 may determine that the received signal was a WUPI that targeted the LP IOE 130. As a result, the secondary transceiver 312 may wake the LP IOE 130 to receive or transmit data, e.g. in a next TTI.

As will be recognized, although the LP IOE 130 is described herein separately from the nominal UEs 120, and as indicated above, an LP IOE 130 may be an example of a nominal UE 120. Thus, a nominal UE 120 may include many if not all of the same components as those described above with respect to the LP IOE 130 of FIG. 3, but for example may or may not include the secondary transceiver 312. For example, a nominal UE 120 may detect the control signals, nominal data, and in embodiments the WUPI with the antenna 320, RF front end 314, primary transceiver 310, and modem 308. The nominal UE 120 may, by way of the processor 302, either act on an explicit indication in a control signal to place the device into a sleep for one or more TTIs, or determine whether the TTI is occupied by a WUPI waveform or not, and place the device into sleep if so, or act according to a radio link failure and resume listening at the start of the next TTI.

Figure 8:
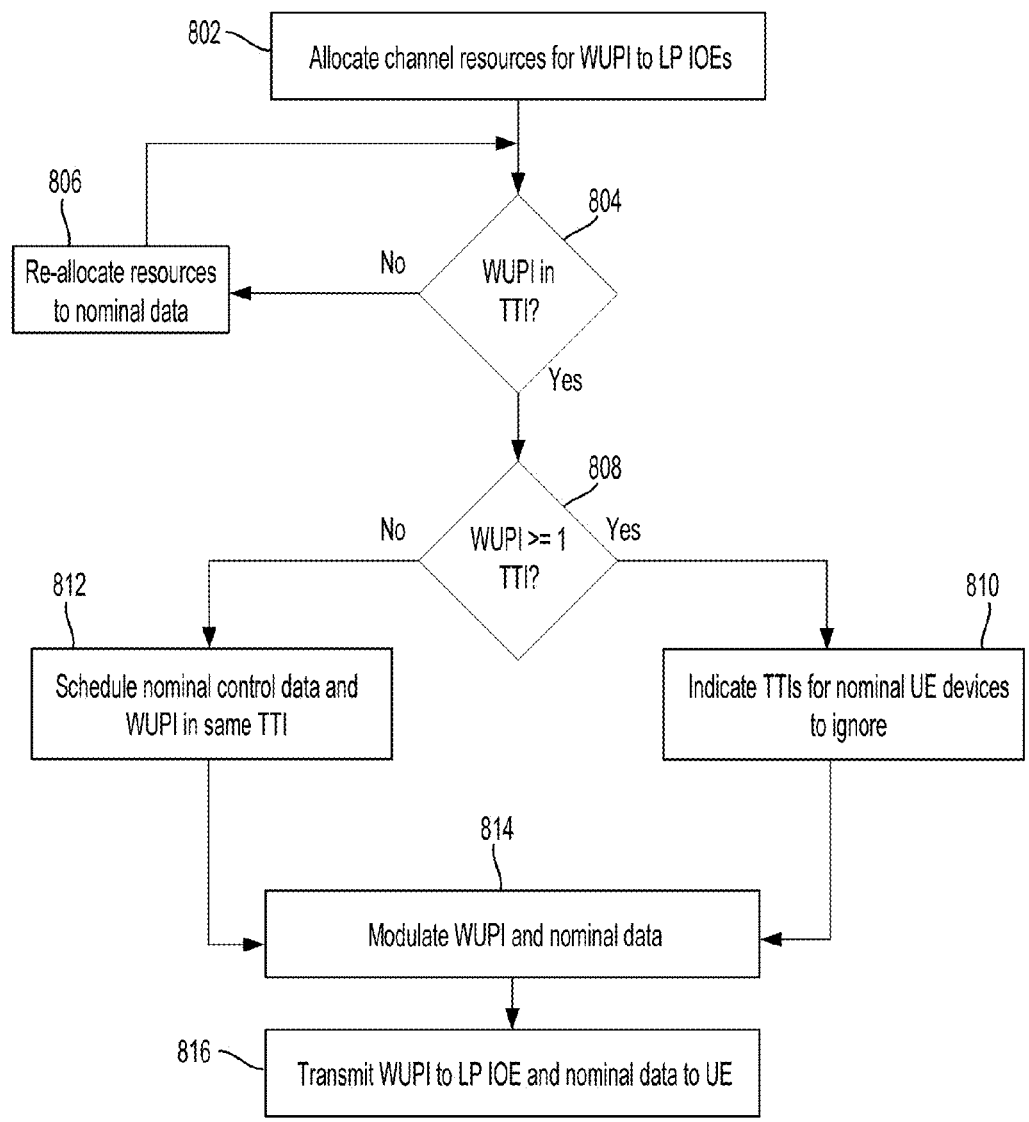
FIG. 8 illustrates a block diagram of a method for multiplexing a downlink to listening devices in accordance with various aspects of the present disclosure.

Referring now to FIG. 8, there is illustrated a block diagram of a method 800 for multiplexing the downlink between LP IOEs 130 and nominal UEs 120, from the perspective of the base station 110. The method 800 may be implemented in a base station 110 that is in communication with one or more nominal UEs 120 and LP IOEs 130. The method 800 will be described with respect to a specific base station 110 for simplicity of discussion, though it will be recognized that the aspects described herein may be applicable to any number of base stations 110. It is understood that additional steps can be provided before, during, and after the steps of method 800, and that some of the steps described can be replaced or eliminated for other embodiments of the method 800.

Beginning at block 802, the base station 110 allocates a unique dedicated set of channel resources (e.g., a block of frequency and time) to each LP IOE 130 for transmission of a WUPI to that LP IOE 130. This ensures that even in the case that all LP IOEs 130 within base station 110's range need to be woken up during the same data cycle there are no collisions, and all LP IOEs 130 may receive their WUPI and wake up to receive their data. However, most of the time there will be no data transmissions scheduled for many of the LP IOEs 130. In such cases it is desirable to be able to reuse the dedicated channel resources for transmission of data to nominal UEs 120.

At decision block 804, the base station 110 determines whether any WUPIs are actually scheduled for transmission in a given TTI. If not, then the method 800 proceeds to block 806.

At block 806, the base station 110 re-allocates any scheduled, but unused, channel resources from WUPI use to nominal data/control data use, for example as described above with respect to FIGS. 4-7. The base station 110 may then modulate and transmit that nominal data. The method 800 then returns to decision block 804.

If, at decision block 804, the base station 110 determines that one or more WUPIs are in need of transmission, the method 800 proceeds to decision block 808.

At decision block 808, the base station 110 determines whether the WUPI occupies more than one transmission time interval (TTI). This may occur when, for example, the WUPI needs to use a long symbol length that causes it to extend beyond one TTI (greater than 16 symbols, as just one example). If the WUPI occupies more than one TTI, there is a danger of the WUPI running into a portion of the data cycle where nominal UEs 120 expect to see control data, therefore puncturing the nominal control data meant for nominal UEs 120 (e.g., a PDCCH). It is desirable that the nominal UEs 120 behave normally in the case that the nominal control data is punctured in such a way. The approach the base station 110 takes may therefore depend on whether the WUPI is greater than one TTI or not, as discussed with respect to FIGS. 4-7 above.

If, at decision block 808, the base station 110 determines that the WUPI occupies more than one TTI, then the method 800 proceeds to block 810. At block 810, the base station 110 uses the nominal control data in a first TTI to indicate to the nominal UEs 120 that one or more WUPIs will occupy at least the next TTI. For example, if the WUPI occupies N TTIs (e.g., 2 or more), the nominal control data from the base station 110 may indicate the number N of TTIs that will be occupied by the WUPI. In an embodiment, this indication in the nominal control data may be in the form of a group discontinuous reception (DRX) command. This indicates to the nominal UEs 120 to ignore the indicated number of TTIs. In response to this indication, in some embodiments the nominal UEs 120 may enter a sleep mode for the indicated number of TTIs in order to save power. In embodiments where the base station 110 does not explicitly inform the nominal UEs 120 of the WUPI in subsequent TTIs, the method may proceed directly to block 814 as discussed further below. Alternatively, when the WUPI occupies N TTIs (e.g., 2 or more), the embodiments discussed with reference to FIGS. 4 and 5 above may be implemented.

If, at decision block 808, the base station 110 determines that the WUPI does not occupy more than one TTI, the method 800 proceeds to block 812. At block 812, the base station 110 may schedule the nominal control data/nominal data and the WUPI within the same TTI so that the WUPI does not puncture the control data. This may include structuring the WUPI and nominal control data in the downlink waveform so that puncturing of the nominal control data is avoided. The base station 110 may treat the WUPI as any other piece of data that can fit within a single TTI, for example by transmitting the WUPI within the same TTI as the nominal control, as illustrated in FIG. 6 above.

The method 800 proceeds from either blocks 810 or 812 to block 814. At block 814, the base station 110 modulates the nominal control data, and/or nominal data, and WUPI within the TTI for transmission. In an embodiment, the WUPI is restricted to transmission on an OFDM subcarrier (or tone) which does not contain nominal control data. The WUPI and the nominal data/control data may be modulated with different schemes. For example, the WUPI may be modulated with a modulation scheme that facilitates non-coherent detection or energy-based detection, such as OOK, frequency-shift keying (FSK), amplitude-shift keying (ASK), or the like while the nominal data is modulated with QAM.

At block 816, after the data and WUPI are modulated, the base station 110 transmits the modulated WUPI to the intended LP IOE(s) 130 and the nominal data to the intended nominal UE(s) 120. In this manner, the base station 110 may reuse scheduled resources for nominal data when WUPI signals are not present, enable nominal UEs 120 to reduce power consumption when WUPI signals are present, and/or avoid the puncturing of nominal control data.

Figure 9:
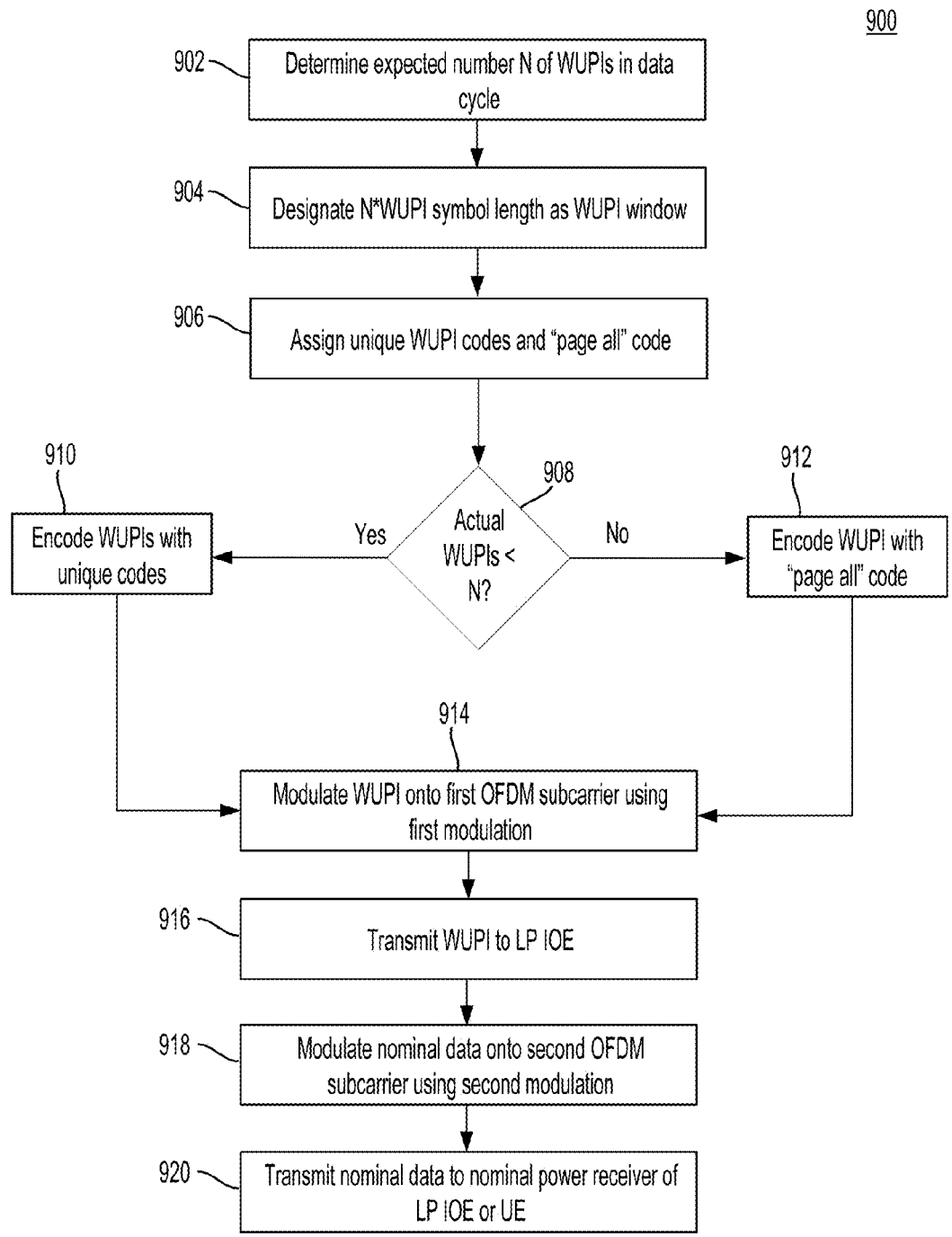
FIG. 9 illustrates a block diagram of a method for using a wake-up paging window in accordance with various aspects of the present disclosure.

Referring now to FIG. 9, there is illustrated a method 900 for creating a WUPI window from the perspective of a base station 110 that is in communication with one or more nominal UEs 120 and LP IOEs 130. The creation of a WUPI window is an alternative to the conditional multiplexing of FIG. 8. The method 900 will be described with respect to a specific base station 110 for simplicity of discussion, though it will be recognized that the aspects described herein may be applicable to any number of base stations 110. It is understood that additional steps can be provided before, during, and after the steps of method 900, and that some of the steps described can be replaced or eliminated for other embodiments of the method 900.

Since the WUPI window is a hard assigned set of time resources, it is desirable to balance making the window as short as possible while making sure that all LP IOEs 130 that need to be sent data during a data cycle can be sent a WUPI. During initial setup, blocks 902-906 are performed. After initial setup, blocks 902-906 need only be performed again if one or more new LP IOEs 130 are added to the system or one or more LP IOEs 130 leave the system. The WUPI parameters determined in blocks 902-906 are communicated to LP IOEs 130 through configuration messages.

At block 902, the base station 110 determines the number of LP IOEs 130 expected to receive data during any given data cycle, which corresponds to the number N of WUPIs that will need to be sent in the data cycle.

At block 904, this number N is multiplied by the code symbol length to determine the ultimate length of the WUPI window. However, in some embodiments, a greater number of LP IOEs 130 need to be woken up than the WUPI window can accommodate.

At block 906, the generated WUPI codes are assigned to individual LP IOEs 130. Further, the base station 110 may designate a specific code as a "page all" code to address situations where greater number of LP IOEs 130 need to be woken up than the WUPI window can accommodate.

Moving forward, blocks 908-920 are performed once per data cycle. At decision block 908, the base station 110 determines whether the number of WUPIs that need to be sent during the data cycle is less than N. For example, N may represent a determined limit of the number of specific WUPIs that a WUPI window can accommodate. If, at decision block 908, the base station 110 determines that the number of WUPIs is less than N, the method 900 proceeds to block 910. At block 910, each unique WUPI is generated with its unique WUPI symbol.

Returning to decision block 908, if the number of WUPIs that need to be sent is more than N, then the method 900 proceeds to block 912 and the base station 110 encodes a WUPI with the page all code. While some power is wasted waking up LP IOEs 130 which are not scheduled to receive data, it is useful to minimize the hard assignment of time resources by keeping the WUPI window as short as possible.

The method 900 proceeds from either block 910 or 912, depending on the result of decision block 908, to block 914. At block 914, the WUPI from block 910 or 912 is encoded onto an OFDM subcarrier using a first modulation scheme. In an embodiment, this modulation scheme may be OOK, which is easier to detect for a low-power companion receiver at one or more LP IOEs 130. In other embodiments, this modulation scheme may be FSK, ASK or another modulation scheme that facilitates non-coherent or energy-based detection.

At block 916, the modulated WUPI is transmitted to the low power companion receiver of the LP IOE 130, or to all LP IOEs 130 in the case of the page all signal. In embodiments where not all WUPI opportunities in the WUPI window are taken (e.g. not as many LP IOEs 130 need to wake up as predicted), the base station 110 may additionally retransmit the modulated WUPI one or more times throughout the WUPI opportunities in the WUPI window.

At block 918, the data is modulated onto a second OFDM subcarrier with a second, different modulation scheme, for example QAM. As will be recognized, though described as a separate block than the modulation of the WUPI(s), these may occur concurrently or in other order. In some embodiments the system bandwidth may be too small to allow frequency division multiplexing to transmit both the WUPI and the nominal data signals at the same time. In these embodiments, neither the WUPI nor the data need to be modulated with OFDM.

At block 920, the modulated data signal is transmitted to the nominal power receiver of the LP IOE 130. As illustrated in FIG. 7, a similar modulated data signal may be transmitted both before and after the determined WUPI window. As a result from the method 900, the nominal data and WUPI waveforms may be cleanly separated.

Figure 10:
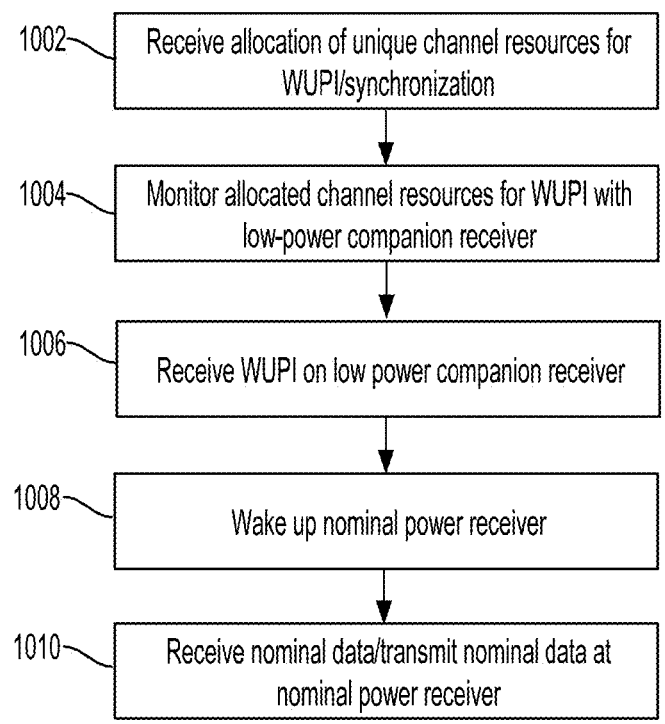
FIG. 10 illustrates a block diagram of a method for receiving multiplexed downlink messages at a low power device in accordance with various aspects of the present disclosure.

Referring now to FIG. 10, there is illustrated a block diagram of a method 1000 for receiving multiplexed downlink messages at a nominal device in accordance with various aspects of the present disclosure. The method 1000 will be described with respect to a specific LP IOE 130 in communication with a single base station 110 for simplicity of discussion, though it will be recognized that the aspects described herein may be applicable to any number of LP IOEs 130 in communication with any number of base stations 110. It is understood that additional steps can be provided before, during, and after the steps of method 1000, and that some of the steps described can be replaced or eliminated for other embodiments of the method 1000.

At block 1002, the LP IOE 130 receives an allocation of dedicated channel resources (i.e., a time and frequency block) from the base station 110, according to any of the preceding embodiments.

At block 1004, the LP IOE 130 monitors the allocated resources for a WUPI, for example over one or multiple TTIs. In an alternative embodiment, LP IOE 130 may instead request that the base station 110 send a WUPI if the base station 110 has data ready for the LP IOE 130.

At block 1006, the LP IOE 130 receives a WUPI on its low power companion receiver. The LP IOE 130 decodes and identifies the WUPI as a wake-up signal, for example as described above with respect to FIG. 3.

At block 1008, the LP IOE 130 wakes up its nominal power receiver in response to the receipt of the WUPI at block 1006.

With the nominal power receiver of the LP IOE 130 on (e.g., after any necessary lag between signaling the nominal receiver to power on and actual power on), at block 1010 the LP IOE 130 receives nominal data on the nominal power receiver. After the data is received, the method 1000 may proceed by the LP IOE 130 again putting its nominal power receiver to sleep, either on its own initiative or in response to a command to that effect from the base station 110. The method 1000 may then again return to block 1004 to monitor for another WUPI in some subsequent TTI.

Figure 11:
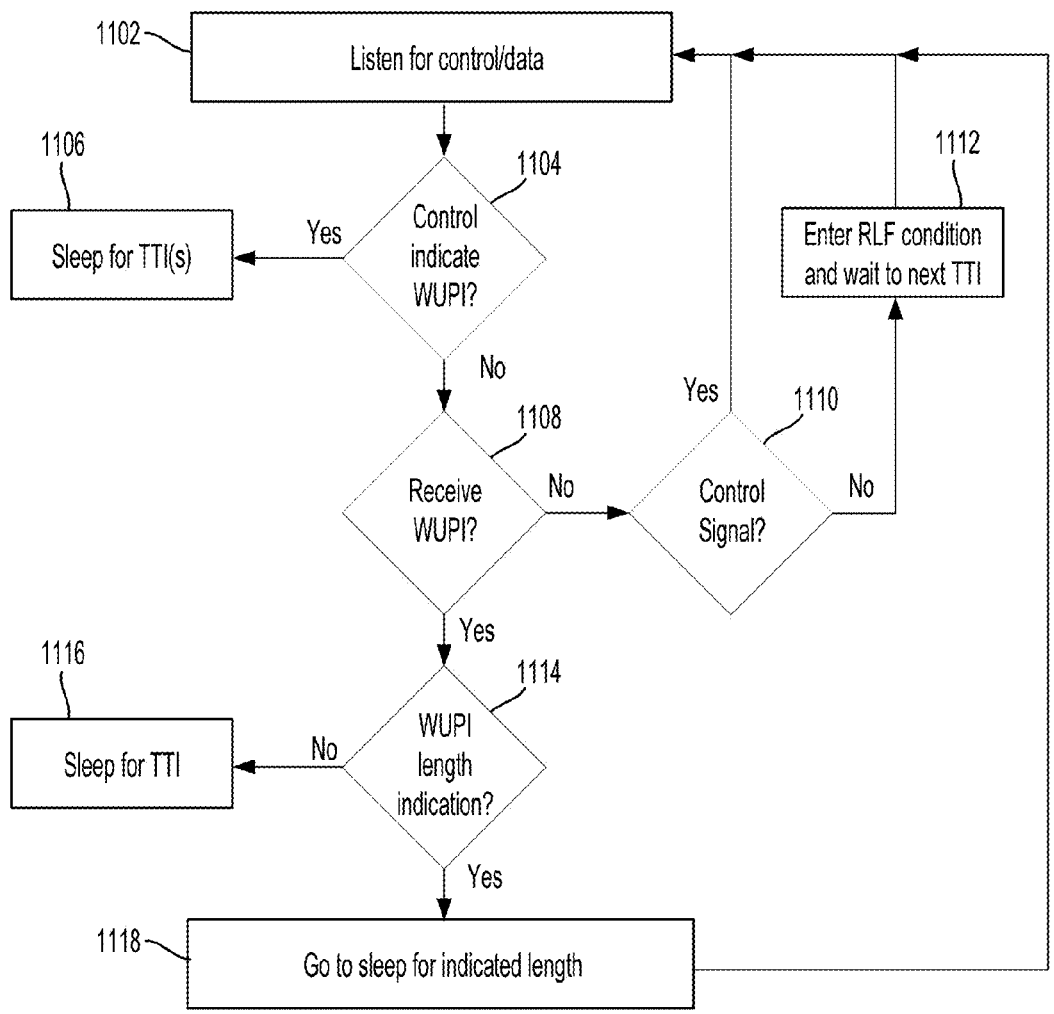
FIG. 11 illustrates a block diagram of a method for receiving multiplexed downlink messages at a nominal device in accordance with various aspects of the present disclosure.

Referring now to FIG. 11, there is illustrated a block diagram of a method 1100 for receiving multiplexed downlink messages at a nominal device in accordance with various aspects of the present disclosure. The method 1100 will be described with respect to a specific nominal UE 120 in communication with a single base station 110 for simplicity of discussion, though it will be recognized that the aspects described herein may be applicable to any number of UEs 120 in communication with any number of base stations 110. It is understood that additional steps can be provided before, during, and after the steps of method 1100, and that some of the steps described can be replaced or eliminated for other embodiments of the method 1100.

At block 1102, the nominal UE 120 monitors for nominal control data or nominal data, for example during any given TTI (such as at the start of a TTI). When the nominal UE 120 receives control data, the method proceeds to decision block 1104.

At decision block 1104, the nominal UE 120 determines whether the control data indicates that a WUPI is scheduled to be sent in the subsequent TTI and, if included, the length of the WUPI (e.g., one or N TTIs), for example as described with respect to FIG. 4 above. If the control data indicates that a WUPI is scheduled for the next TTI, the method 1100 proceeds to action 1106.

At block 1106, nominal UE 120 enters a micro or deep sleep for at least one TTI. For example, where the control data did not indicate a length of the pending WUPI, the nominal UE 120 may sleep for only one TTI and then again listen for additional control data/data. As another example, where the control data indicates how long the WUPI will be, the nominal UE 120 may sleep for the specified number of TTIs.

Returning to decision block 1104, if the control data does not indicate that a WUPI is scheduled, then the method 1100 proceeds to decision block 1108. At decision block 1108, the nominal UE 120 determines whether a WUPI is received at its receiver during a TTI, for example according to the conditional multiplexing embodiments described previously. If at decision block 1108 the nominal UE 120 determines that a WUPI has not been received, the method 1100 proceeds to decision block 1110.

At decision block 1110, if the nominal UE 120 determines that it has received nominal control data during the TTI (e.g., PDCCH), then the method 1100 may return to block 1102 to listen for further data/control data. If the nominal UE 120 determines that it has not received control data either (e.g., no PDCCH) at decision block 1110, then the method 1100 proceeds to block 1112.

At block 1112, the nominal UE 120 interprets the lack of control data as a communication failure (e.g. a radio link failure). This may occur even in situations where a WUPI was transmitted, but the nominal UE 120 is unable to decode it. The behavior of the nominal UE 120 when the interpreted radio link failure occurs is designed to allow the nominal UE 120 to recover reliably and continue monitoring for nominal control data in the next data cycle by proceeding back to block 1102.

Returning to decision block 1108, if the nominal UE 120 determines that a WUPI has been received, then the method 1100 proceeds to decision block 1114. When the nominal UE 120 detects a WUPI, the nominal UE 120 determines that it can safely ignore the information from at least that TTI. At decision block 1114, the nominal UE 120 determines whether the received WUPI includes a length indication, either directly or by providing information that allows length of the WUPI to be inferred or estimated.

If the WUPI length cannot be detected, the method 1100 proceeds to block 1116 where the nominal UE 120 enters a microsleep for the remainder of the present TTI.

If the WUPI length can be detected, then the method 1100 proceeds to block 1118. At block 1118, the nominal UE 120 extracts the embedded information regarding the length of the WUPI and then enters a sleep for the indicated length (e.g., a number of TTIs). The method 1100 may then return to block 1102 to listen for control data/data after waking up from the specified length of time.

Figure 12:
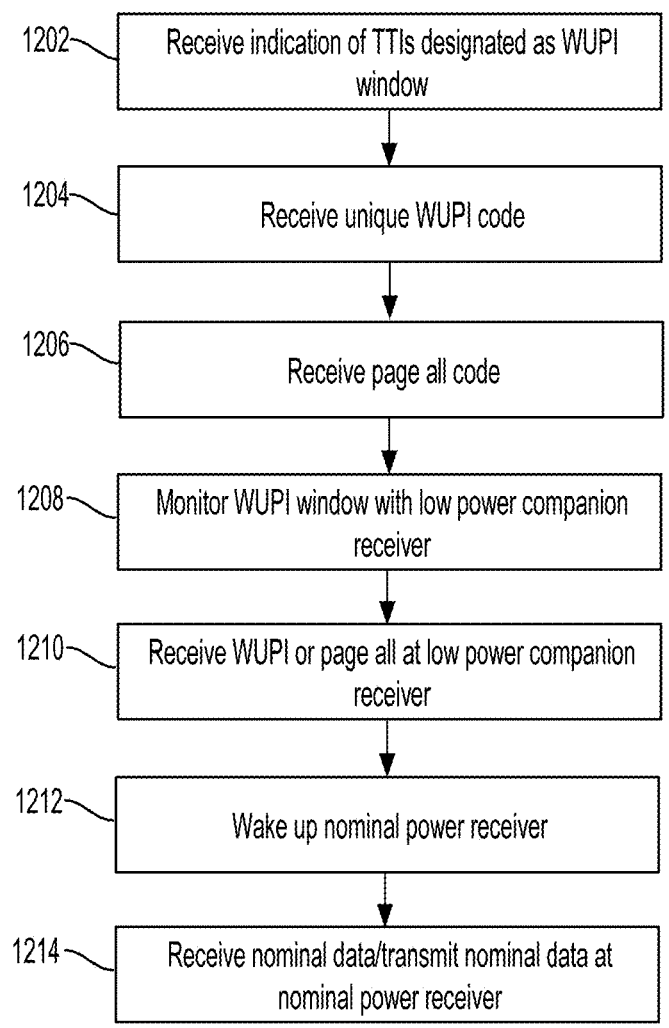
FIG. 12 illustrates a method for receiving multiplexed downlink messages at a low power device in accordance with various aspects of the present disclosure.

Referring now to FIG. 12, there is illustrated a method 1200 for using a wake-up paging window in accordance with various aspects of the present disclosure. The method 1200 will be described with respect to a specific LP IOE 130 in communication with a single base station 110 for simplicity of discussion, though it will be recognized that the aspects described herein may be applicable to any number of LP IOEs 130 in communication with any number of base stations 110. It is understood that additional steps can be provided before, during, and after the steps of method 1200, and that some of the steps described can be replaced or eliminated for other embodiments of the method 1200.

At block 1202, the LP IOE 130 receives an indication from the base station 110 of which TTIs in the data cycle are designated as the WUPI window. As described above with respect to FIGS. 2, 7, and 9, the size of the WUPI window may be influenced by the selected code symbol length of the WUPIs, as well as a prediction of the actual number of WUPIs that may be required in any given TTI or window.

At block 1204, the LP IOE 130 receives a unique WUPI code from the base station 110. Further, at block 1206, the LP IOE 130 receives the page all code from the base station 110. Although illustrated as separate blocks, it will be recognized that these may be received together at the LP IOE 130 as well.

At block 1208, the LP IOE 130 monitors the assigned WUPI window with a low power companion receiver for either the unique WUPI code assigned to the LP IOE 130 or the page all code.

At block 1210, the LP IOE 130 receives either its unique WUPI or the page all code on its low power companion receiver. The LP IOE 130 determines which WUPI has been received, for example by determining a level of correlation between either the unique WUPI code it was assigned or the page all code.

Either way, at block 1212, the low power companion receiver proceeds with waking up the nominal power receiver of the LP IOE 130.

After the nominal power receiver has recovered from its sleep, at block 1214 the LP IOE 130 receives nominal data (or transmits requested nominal data) on its nominal power receiver. After the data transaction is completed, the base station 110 may either instruct the LP IOE 130 to place the nominal power receiver back to sleep or the LP IOE 130 may do so on its own accord, for example after a time out period expires.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

In one embodiment, the present disclosure includes a method of wireless communication, comprising: transmitting, from a first wireless communication device, a wake-up paging indicator (WUPI) during a first transmission time interval (TTI), the WUPI indicating to a second wireless communication device to wake up and listen for a data signal from the first wireless communication device during a second TTI. Transmitting, from the first wireless communication device to the second wireless communication device, the data signal during the second TTI. Including both the WUPI and the data signal in an orthogonal frequency division multiplexing (OFDM) waveform. allocating, at the first wireless communication device, a first set of channel resources to the second wireless communication device for transmitting the WUPI.

In some embodiments, the above method further comprises: transmitting, from the first wireless communication device, a control signal, transmitting the control signal on a first frequency bandwidth, and transmitting the WUPI on a second frequency bandwidth. In some embodiments, the first frequency bandwidth belongs to a first set of component carriers in a carrier aggregation scheme, and the second frequency bandwidth belongs to a second set of component carriers in the carrier aggregation scheme. In other embodiments, the first frequency bandwidth belongs to a first subcarrier of an OFDM scheme, and the second frequency belongs to a second subcarrier of the OFDM scheme. In some embodiments the control signal and the WUPI are transmitted sequentially within the first TTI.

The above method of wireless communication may further comprise: designating, at the first wireless communication device, a time window within a data cycle for transmitting at least one WUPI, wherein the time window comprises at least an amount of TTIs equivalent to an expected amount of WUPIs that will be transmitted during the data cycle, determining, at the first wireless communication device, a probability that one of a plurality of second wireless communication devices will be transmitted the at least one WUPI during the data cycle, and determining, at the first wireless communication device, based on the probability and an amount of second wireless communication devices, an average amount of WUPIs that will be transmitted during the data cycle.

In another embodiment, the present disclosure includes a first wireless communication device comprising: a processor configured to generate a wake-up paging indicator (WUPI) and a data signal, the processor further configured to include both the WUPI and the data signal in an orthogonal frequency division multiplexing (OFDM) waveform, and a transceiver configured to transmit the WUPI to a second wireless communication device during a first transmission time interval (TTI) and to transmit the data signal to the second wireless communication device during a second TTI, wherein the WUPI indicates to the second wireless communication device to wake up and listen for the data signal.

In an embodiment of the above first wireless communication device, an OFDM subcarrier containing the WUPI is modulated with on-off keying (OOK) and an OFDM subcarrier containing the data signal is modulated with quadrature amplitude modulation (QAM). In another embodiment of the above first wireless communication device, the transceiver is further configured to transmit a control signal that includes information that a third wireless communication device uses to turn off a receiver for an indicated amount of TTIs. The transceiver may be further configured to transmit the control signal on a first frequency bandwidth and the WUPI on a second frequency bandwidth. The first frequency bandwidth may belongs to a first set of component carriers in a carrier aggregation scheme, and the second frequency bandwidth may belong to a second set of component carriers in the carrier aggregation scheme. Alternatively, the first frequency may belong to a first subcarrier of an OFDM scheme, and the second frequency may belong to a second subcarrier of the OFDM scheme. The transceiver may further be configured to transmit the control signal and the WUPI sequentially within the first TTI.

In another embodiment of the above first wireless communication device, the processor is further configured to: determine a probability that one of a plurality of second wireless communication devices will be transmitted the WUPI during the data cycle, and determine, based on the probability and an amount of second wireless communication devices, an average amount of WUPIs that will be transmitted during the data cycle.

In another embodiment of the above first wireless communication device, the processor is further configured to assign a second code common to all of a plurality of second wireless devices and encode the WUPI with the second code, and the transceiver is further configured to transmit the WUPI to the plurality of second wireless devices.

In some embodiments, the first wireless communication device comprises a base station, the second wireless communication device comprises a low power internet of anything device, and the third wireless communication device comprises a user equipment.

In another embodiment, the present disclosure includes a first wireless communication device comprising: a first receiver configured to receive a wake-up paging indicator (WUPI) from a second wireless communication device during a first transmission time interval (TTI) and a processor configured to detect the WUPI and wake up a second receiver in response to the WUP, wherein the second receiver configured to receive a data signal from the second wireless communication device after waking up during a second TTI, and wherein the WUPI and the data signal are both included in an orthogonal frequency division multiplexing (OFDM) waveform.

In an embodiment of the above first wireless communication device, an OFDM subcarrier containing the WUPI is modulated with on-off keying (OOK) and an OFDM subcarrier containing the data signal is modulated with quadrature amplitude modulation (QAM).

In another embodiment of the above first wireless communication device, the first wireless device further comprises a transmitter configured to transmit to the second wireless communication device a request for the WUPI.

In another embodiment of the above first wireless communication device, the first receiver is further configured to receiver from the second wireless communication device an indication of a time window within a data cycle during which the WUPI will be transmitted.

In another embodiment of the above first wireless communication device, the first wireless communication device comprises a low power internet of everything device and the second wireless communication device comprises a base station.

In another embodiment, the present disclosure includes a first wireless communication device, comprising a receiver configured to receive from a second wireless communication device a control signal during a transmission time interval (TTI), the control signal providing to the first wireless communication device an allocation of channel resources to monitor for a nominal data signal, the receiver further configured to monitor the allocated channel resources for the nominal data signal, wherein the allocation of channel resources is multiplexed between the first wireless communication device and a third wireless communication device.

In some embodiments of the above first wireless communication device, the control signal may be a nominal control signal, and the nominal control signal may contain an indication that a wake-up paging indicator (WUPI) occupies at least a next TTI. The first wireless communication device may further comprise a processor configured to turn off a receiver for the next TTI in response to the nominal control signal. The nominal control signal may contains an indication of a length of the WUPI, and the device may further comprise a processor configured to turn off a receiver for the indicated length in response to the nominal control signal.

In some embodiments of the above first wireless communication device the control signal is a wake-up paging indicator (WUPI). The WUPI may contain a length indication, and the device may further comprise a processor configured to determine that the WUPI includes a length indication, the processor further configured to turn off a receiver for at least the indicated length. The device may further comprise a processor configured to determine that the WUPI does not include a length indication, the processor further configured to turn off a receiver for at least one TTI in response to the determination that the WUPI does not include the length indication. The device may further comprise a processor not configured to detect the WUPI, the processor configured to enter a radio link failure (RLF) mode until a next TTI, and the receiver configured to monitor, during the next TTI, for a control signal from the second wireless communication device.

In some embodiments of the above first wireless communication device the allocation of channel resources has previously been allocated to the third wireless communication device.

In some embodiments of the above first wireless communication device the receiver is further configured to receive from the second wireless communication device the nominal data signal, and the control signal and the nominal data signal are carried in an orthogonal frequency division multiplexing (OFDM) waveform.

In some embodiments, the above first wireless communication device further comprises a processor configured to turn off the receiver for a duration of a time window included in the control signal, the time window being a data cycle reserved for transmitting a wake-up paging indicator (WUPI).

In some embodiments of the above first wireless communication device the first wireless communication device comprises a user equipment, the second wireless communication device comprises a base station, and the third wireless communication device comprises a low power internet of everything device.

In another embodiment, the present disclosure includes a computer-readable medium having program code recorded thereon, the program code comprising code for causing a first wireless communication device to transmit to a second wireless communication device a wake-up paging indicator (WUPI) during a first transmission time interval (TTI), the WUPI indicating to the second wireless communication device to wake up and listen for a data signal from the first wireless communication device during a second TTI, and code for causing the first wireless communication device to transmit to the second wireless communication device the data signal during the second TTI.

In some embodiments of the above computer-readable medium, the program code further comprises code for causing the WUPI to be transmitted to a first receiver of the second wireless communication device and for causing the data signal to be transmitted to a second receiver of the second wireless communication device, and the first receiver is a lower power receiver than the second receiver.

In some embodiments of the above computer-readable medium, the program code further comprises code for causing both the WUPI and the data signal to be included in an orthogonal frequency division multiplexing (OFDM) waveform. The program code may further comprise code for causing an OFDM subcarrier of the OFDM waveform containing the WUPI to be modulated with on-off keying (OOK), and code for causing an OFDM subcarrier containing the data signal to be modulated with quadrature amplitude modulation (QAM).

In some embodiments of the above computer-readable medium, the program code further comprises code for causing a first set of channel resources to be allocated to the second wireless communication device for transmitting the WUPI. The program code may further comprise code for causing the first wireless communication device to transmit a control signal and code for causing the control signal to include information that a third wireless communication device uses to turn off a receiver for an indicated amount of TTIs. The program code may further comprise code for causing the control signal to be transmitted on a first frequency bandwidth, and code for causing the WUPI to be transmitted on a second frequency bandwidth. The first frequency bandwidth may belong to a first set of component carriers in a carrier aggregation scheme, and the second frequency bandwidth may belong to a second set of component carriers in the carrier aggregation scheme. Alternatively, the first frequency may belong to a first subcarrier of an OFDM scheme, and the second frequency may belong to a second subcarrier of the OFDM scheme. In some embodiments, the program code may further comprise code for causing the control signal and the WUPI to be transmitted sequentially within the first TTI.

In some embodiments of the above computer-readable medium, the program code further comprises code for causing to be designated a time window within a data cycle for transmitting at least one WUPI, and code for causing the time window to comprise at least an amount of TTIs equivalent to an expected amount of WUPIs that will be transmitted during the data cycle. The program code may further comprise code for causing a unique code to be assigned to the second wireless communication device and code for causing the at least one WUPI to be encoded with the unique code assigned to the second wireless communication device. The program code may further comprise code for causing to be determined a probability that one of a plurality of second wireless communication devices will be transmitted the at least one WUPI during the data cycle, and code for causing to be determined, based on the probability and an amount of second wireless communication devices, an average amount of WUPIs that will be transmitted during the data cycle. The program code may further comprise code for causing a second code common to all of a plurality of second wireless devices to be assigned, code for causing the WUPI to be encoded with the second code, and code for causing the WUPI to be transmitted to the plurality of second wireless devices.

In some embodiments of the above computer-readable medium, the first wireless communication device comprises a base station, the second wireless communication device comprises a low power internet of everything device, and the third wireless communication device comprises a user equipment.

In another embodiment, the present disclosure includes a computer-readable medium having program code recorded thereon, the program code comprising: code for causing a first wireless communication device to receive from a second wireless communication device a wake-up paging indicator (WUPI) during a first transmission time interval (TTI), code for causing the first wireless communication device to wake up in response to the WUPI, code for causing the first wireless communication device to listen for a data signal from the second wireless communication device during a second TTI, and code for causing the first wireless communication device to receive from the second wireless communication device the data signal during the second TTI.

In some embodiments of the above computer-readable medium, the program code further comprises code for causing the WUPI to be received at a first receiver of the first wireless communication device, and code for causing the data signal to be received at a second receiver of the first wireless communication device, wherein the first receiver is a lower power receiver than the second receiver. The program code may further comprise code for causing both the WUPI and the data signal to be included in an orthogonal frequency division multiplexing (OFDM) waveform, code for causing an OFDM subcarrier of the OFDM waveform containing the WUPI to be modulated with on-off keying (OOK), and code for causing an OFDM subcarrier containing the data signal to be modulated with quadrature amplitude modulation (QAM).

In some embodiments of the above computer-readable medium, the program code further comprises code for causing the first wireless communication device to receive from the second wireless communication device an allocation of a set of channel resources, and code for causing the first wireless communication device to monitor the set of channel resources for the WUPI. The program code may further comprise code for causing the first wireless communication device to transmit to the second wireless communication device a request for the WUPI.

In some embodiments of the above computer-readable medium, the program code further comprises code for causing the first wireless communication device to receive from the second wireless communication device, an indication of a time window within a data cycle during which the WUPI will be transmitted.

In some embodiments of the above computer-readable medium, the program code further comprises code for causing the first wireless communication device to receive from the second wireless communication device a unique code, wherein the WUPI is encoded with the unique code.

In some embodiments of the above computer-readable medium, the program code further comprises code for causing the first wireless communication device to receive from the second wireless communication device a common code, wherein the WUPI is encoded with the common code.

In some embodiments of the above computer-readable medium, the first wireless communication device comprises a low power internet of everything device and the second wireless communication device comprises a base station.

In another embodiment, the present disclosure includes a computer-readable medium having program code recorded thereon, the program code comprising: code for causing a first wireless communication device to receive, during a transmission time interval (TTI), from a second wireless communication device, a control signal which provides to the first wireless communication device an allocation of channel resources to monitor for a nominal data signal, code for causing the first wireless communication device to monitor the allocated resources for the nominal data signal, and wherein the allocation of channel resources is multiplexed between the first wireless communication device and a third wireless communication device.

In some embodiments of the above computer-readable medium the control signal is a nominal control signal, and the nominal control signal contains an indication that a wake-up paging indicator (WUPI) occupies at least a next TTI. The program code may further comprise code for causing the first wireless communication device to turn off a receiver for the next TTI in response to the nominal control signal. The nominal control signal may contain an indication of a length of the WUPI, and the program code may further comprise code for causing the first wireless communication device to turn off a receiver for the indicated length.

In some embodiments of the above computer-readable medium the control signal is a wake-up paging indicator (WUPI). The WUPI may contain a length indication, and the program code may further comprise code for causing the first wireless communication device to turn off a receiver for at least the indicated length. The program code may further comprise code for causing the first wireless communication device to determine that the WUPI does not include a length indication, and code for causing the first wireless communication device to turn off a receiver for at least one TTI in response to determining that the WUPI does not include a length indication. The program code may further comprise code for causing the first wireless communication device to enter a radio link failure (RLF) mode until a next TTI, and code for causing the first wireless communication device to monitor during the next TTI for a control signal from the second wireless communication device.

In some embodiments of the above computer-readable medium the allocation of channel resources has previously been allocated to the third wireless communication device.

In some embodiments of the above computer-readable medium the program code further comprises code for causing the first wireless communication device to receive from the second wireless communication device the nominal data signal, wherein the control signal and the nominal data signal are carried in an orthogonal frequency division multiplexing (OFDM) waveform.

In some embodiments of the above computer-readable medium the program code further comprises code for causing the first wireless communication device to turn off a receiver for a duration of a time window included in the control signal, the time window being a data cycle reserved for transmitting a wake-up paging indicator (WUPI).

In some embodiments of the above computer-readable medium the first wireless communication device comprises a user equipment, the second wireless communication device comprises a base station, and the third wireless communication device comprises a low power internet of everything device.

In another embodiment, the present disclosure includes a first wireless communication device, comprising: means for generating a wake-up paging indicator (WUPI) and a data signal, means for transmitting the WUPI to a second wireless communication device during a first transmission time interval (TTI), and means for transmitting the data signal to the second wireless communication device during a second TTI, wherein the WUPI indicates to the second wireless communication device to wake up and listen for the data signal.

In some embodiments of the above first wireless communication device the WUPI is transmitted to a first receiver of the second wireless communication device, the data signal is transmitted to a second receiver of the second wireless communication device, and the first receiver is a lower power receiver than the second receiver.

In some embodiments the above first wireless communication device further comprises means for including both the WUPI and the data signal in an orthogonal frequency division multiplexing (OFDM) waveform. The first wireless communication device may further comprise means for modulating an OFDM subcarrier containing the WUPI with on-off keying (OOK), and means for modulating an OFDM subcarrier containing the data signal with quadrature amplitude modulation (QAM).

In some embodiments the above first wireless communication device further comprises means for allocating, a first set of channel resources to the second wireless communication device for transmitting the WUPI.

In some embodiments the above first wireless communication device further comprises means for transmitting a control signal. The control signal may include information that a third wireless communication device uses to turn off a receiver for an indicated amount of TTIs. The first wireless communication device may further comprise means for transmitting the control signal on a first frequency bandwidth, and means for transmitting the WUPI on a second frequency bandwidth, wherein the first frequency bandwidth belongs to a first set of component carriers in a carrier aggregation scheme, and wherein the second frequency bandwidth belongs to a second set of component carriers in the carrier aggregation scheme. Alternatively, the first frequency belongs to a first subcarrier of an OFDM scheme, and the second frequency belongs to a second subcarrier of the OFDM scheme. The control signal and the WUPI may be transmitted sequentially within the first TTI.

In some embodiments the above first wireless communication device further comprises means for designating a time window within a data cycle for transmitting at least one WUPI, wherein the time window comprises at least an amount of TTIs equivalent to an expected amount of WUPIs that will be transmitted during the data cycle. The first wireless communication device may further comprise means for assigning a unique code to the second wireless communication device, and means for encoding the at least one WUPI with the unique code assigned to the second wireless communication device. The first wireless communication device may further comprise means for determining a probability that one of a plurality of second wireless communication devices will be transmitted the at least one WUPI during the data cycle, and means for determining based on the probability and an amount of second wireless communication devices, an average amount of WUPIs that will be transmitted during the data cycle. The first wireless communication device may further comprise means for assigning a second code common to all of a plurality of second wireless devices, means for encoding the WUPI with the second code, and means for transmitting the WUPI to the plurality of second wireless devices.

In some embodiments of the above first wireless communication device, the first wireless communication device comprises a base station, the second wireless communication device comprises a low power internet of everything device, and the third wireless communication device comprises a user equipment.

In another embodiment, the present disclosure includes a first wireless communication device, comprising: means for receiving from a second wireless communication device a wake-up paging indicator (WUPI) during a first transmission time interval (TTI), means for waking up in response to the WUPI, means for listening for a data signal from the second wireless communication device during a second TTI, and means for receiving from the second wireless communication device the data signal during the second TTI.

In some embodiments the above first wireless communication device further comprises means for receiving the WUPI at a first receiver, and means for receiving the data signal at a second receiver, wherein the first receiver is a lower power receiver than the second receiver.

In some embodiments of the above first wireless communication device, the WUPI and the data signal are both included in an orthogonal frequency division multiplexing (OFDM) waveform. An OFDM subcarrier containing the WUPI may be modulated with on-off keying (OOK) and an OFDM subcarrier containing the data signal may be modulated with quadrature amplitude modulation (QAM).

In some embodiments the above first wireless communication device further comprises means for receiving from the second wireless communication device an allocation of a set of channel resources, and means for monitoring the set of channel resources for the WUPI. The first wireless communication device may further comprise means for transmitting to the second wireless communication device, a request for the WUPI.

In some embodiments the above first wireless communication device further comprises means for receiving from the second wireless communication device an indication of a time window within a data cycle during which the WUPI will be transmitted.

In some embodiments the above first wireless communication device further comprises means for receiving from the second wireless communication device a unique code, wherein the WUPI is encoded with the unique code.

In some embodiments the above first wireless communication device further comprises means for receiving from the second wireless communication device, a common code, wherein the WUPI is encoded with the common code.

In some embodiments of the above first wireless communication device, the first wireless communication device comprises a low power internet of everything device and the second wireless communication device comprises a base station.

In another embodiment, the present disclosure includes a first wireless communication device, comprising: means for receiving from a second wireless communication device a control signal during a transmission time interval (TTI) which provides to the first wireless communication device an allocation of channel resources to monitor for a nominal data signal, and means for monitoring the allocated channel resources for the nominal data signal, wherein the allocation of channel resources is multiplexed between the first wireless communication device and a third wireless communication device.

In some embodiments of the above first wireless communication device, the control signal is a nominal control signal, and the nominal control signal contains an indication that a wake-up paging indicator (WUPI) occupies at least a next TTI. The first wireless communication device may further comprise means for turning off a receiver for the next TTI in response to the nominal control signal. Alternatively, the nominal control signal may contain an indication of a length of the WUPI, and the first wireless communication device may further comprise means for turning off a receiver for at least the indicated length.

In some embodiments of the above first wireless communication device, the control signal is a wake-up paging indicator (WUPI). The WUPI may contain a length indication, and the first wireless communication device may further comprise means for turning off a receiver for at least the indicated length. The first wireless communication device may further comprise means for turning off a receiver for at least one TTI in response to determining that the WUPI does not include a length indication. Alternatively, the first wireless communication device may be unable to detect the WUPI, in which case the device further comprises means for entering a radio link failure (RLF) mode until a next TTI and means for monitoring during the next TTI for a control signal from the second wireless communication device.

In some embodiments of the above first wireless communication device, the allocation of channel resources has previously been allocated to the third wireless communication device.

In some embodiments the above first wireless communication device further comprises means for receiving from the second wireless communication device the nominal data signal, wherein the control signal and the nominal data signal are carried in an orthogonal frequency division multiplexing (OFDM) waveform.

In some embodiments the above first wireless communication device further comprises means for turning off, at the first wireless communication device, a receiver for a duration of a time window included in the control signal, the time window being a data cycle reserved for transmitting a wake-up paging indicator (WUPI).

In some embodiments of the above first wireless communication device, the first wireless communication device comprises a user equipment, the second wireless communication device comprises a base station, and the third wireless communication device comprises a low power internet of everything device.

What is claimed is:

1. A method of wireless communication, comprising:
   determining, by a first wireless communication device, between transmitting a wake-up paging indicator (WUPI) to a second wireless communication device and a signal to a third wireless communication device based on whether the WUPI is ready to be sent;
   transmitting, from the first wireless communication device in response to determining to transmit the WUPI, the WUPI during a first transmission time interval (TTI), the WUPI indicating to the second wireless communication device to wake up and listen for a data signal from the first wireless communication device during a second TTI;
   transmitting, from the first wireless communication device to the second wireless communication device, the data signal during the second TTI; and
   including both the WUPI and the data signal in an orthogonal frequency division multiplexing (OFDM) waveform.

2. The method of claim 1, wherein:
   the WUPI is transmitted to a first receiver of the second wireless communication device and the data signal is transmitted to a second receiver of the second wireless communication device, and
   the first receiver is a lower power receiver than the second receiver.

3. The method of claim 1, further comprising:
   modulating an OFDM subcarrier of the OFDM waveform containing the WUPI with on-off keying (OOK); and
   modulating an OFDM subcarrier containing the data signal with quadrature amplitude modulation (QAM).

4. The method of claim 1, further comprising:
   allocating, at the first wireless communication device, a set of channel resources to the second wireless communication device for transmitting the WUPI,
   wherein the determining further comprises determining between transmitting the WUPI using the set of channel resources and the signal using the set of channel resources.

5. The method of claim 1, further comprising:
   transmitting, from the first wireless communication device, a control signal.

6. The method of claim 5, wherein the control signal includes information that the third wireless communication device uses to turn off a receiver for an indicated amount of TTIs.

7. The method of claim 5, further comprising:
   transmitting the control signal on a first frequency bandwidth according to a first form of modulation; and
   transmitting the WUPI on a second frequency bandwidth according to a second form of modulation different from the first form of modulation during the first TTI, wherein the first and second frequency bandwidth are non-overlapping.

8. The method of claim 1, further comprising:
   designating, at the first wireless communication device, a time window within a data cycle for transmitting at least one WUPI,
   wherein the time window comprises at least an amount of TTIs equivalent to an expected amount of WUPIs that will be transmitted during the data cycle.

9. The method of claim 8, further comprising:
   assigning, at the first wireless communication device, a unique code to the second wireless communication device; and
   encoding, at the first wireless communication device, the at least one WUPI with the unique code assigned to the second wireless communication device.

10. The method of claim 8, further comprising:
    assigning, at the first wireless communication device, a second code common to all of a plurality of second wireless devices;
    encoding, at the first wireless communication device, the WUPI with the second code; and
    transmitting, from the first wireless communication device, the WUPI to the plurality of second wireless devices.

11. The method of claim 1, wherein:
    the first wireless communication device comprises a base station;
    the second wireless communication device comprises a low power internet of everything device; and
    the third wireless communication device comprises a user equipment.

12. A method of wireless communication, comprising:
    receiving, at a first wireless communication device from a second wireless communication device in response to a determination between transmitting a wake-up paging indicator (WUPI) to the first wireless communication device and a signal to a third wireless communication device based on whether the WUPI is ready to be sent, the WUPI during a first transmission time interval (TTI);

waking up, at the first wireless communication device, in response to receipt of the WUPI;

listening, at the first wireless communication device, for a data signal from the second wireless communication device during a second TTI after the first TTI; and receiving, at the first wireless communication device from the second wireless communication device, the data signal during the second TTI, wherein the WUPI and the data signal are both included in an orthogonal frequency division multiplexing (OFDM) waveform.

13. The method of claim 12, further comprising:
receiving the WUPI at a first receiver of the first wireless communication device; and
receiving the data signal at a second receiver of the first wireless communication device,
wherein the first receiver is a lower power receiver than the second receiver.

14. The method of claim 12, wherein an OFDM subcarrier containing the WUPI is modulated with on-off keying (OOK) and an OFDM subcarrier containing the data signal is modulated with quadrature amplitude modulation (QAM).

15. The method of claim 12, further comprising:
receiving, at the first wireless communication device from the second wireless communication device, an allocation of a set of channel resources, the determination being between transmitting the WUPI using the set of channel resources and the signal using the set of channel resources, and wherein the signal comprises a data signal; and
monitoring, at the first wireless communication device, the set of channel resources for the WUPI.

16. The method of claim 15, further comprising:
transmitting, from the first wireless communication device to the second wireless communication device, a request for the WUPI.

17. The method of claim 12, further comprising:
receiving, at the first wireless communication device from the second wireless communication device, an indication of a time window within a data cycle during which the WUPI will be transmitted.

18. The method of claim 12, further comprising:
receiving, at the first wireless communication device from the second wireless communication device, a unique code,
wherein the WUPI is encoded with the unique code.

19. The method of claim 12, further comprising:
receiving, at the first wireless communication device from the second wireless communication device, a common code,
wherein the WUPI is encoded with the common code.

20. The method of claim 12, wherein:
the first wireless communication device comprises a low power internet of everything device;
the second wireless communication device comprises a base station; and
the third wireless communication device comprises a user equipment.

21. A first wireless communication device, comprising:
a processor configured to:
allocate a set of channel resources to a second wireless communication device for transmission of a wake-up paging indicator (WUPI) to the second wireless communication device;
determine between transmitting the WUPI to the second wireless communication device using the set of channel resources and a signal to a third wireless communication device using the set of channel resources based on whether the WUPI is scheduled to be sent;
generate the WUPI and a data signal in response to determining to transmit the WUPI; and
include both the WUPI and the data signal in an orthogonal frequency division multiplexing (OFDM) waveform; and
a transceiver configured to transmit the WUPI to the second wireless communication device during a first transmission time interval (TTI) and to transmit the data signal to the second wireless communication device during a second TTI,
wherein the WUPI indicates to the second wireless communication device to wake up and listen for the data signal.

22. The first wireless communication device of claim 21, wherein:
the transceiver transmits the WUPI to a first receiver of the second wireless communication device,
the transceiver transmits the data signal to a second receiver of the second wireless communication device, and
the first receiver is a lower power receiver than the second receiver.

23. The first wireless communication device of claim 21, wherein:
the processor is further configured to determine a number of TTIs including the first TTI required to transmit the WUPI prior to the second TTI; and
the transceiver is further configured to transmit the determined number of TTIs to the third wireless communication device that the third wireless communication device uses to turn off a receiver for the determined number of TTIs.

24. The first wireless communication device of claim 21, wherein:
the processor is further configured to designate a time window within a data cycle for transmitting at least one WUPI, and
the time window comprises at least an amount of TTIs equivalent to an average amount of WUPIs that will be transmitted during the data cycle.

25. The first wireless communication device of claim 21, wherein the processor is further configured to:
assign a unique code to the second wireless communication device, and
encode the WUPI with the unique code assigned to the second wireless communication device.

26. A first wireless communication device, comprising:
a first receiver configured to receive a wake-up paging indicator (WUPI) from a second wireless communication device during a first transmission time interval (TTI) in response to a determination between transmitting the WUPI to the first wireless communication device and a signal to a third wireless communication device based on whether the WUPI is ready to be sent; and
a processor configured to detect the WUPI and wake up a second receiver in response to receipt of the WUPI,
wherein the second receiver is configured to receive a data signal from the second wireless communication device after waking up during a second TTI after the first TTI, and wherein the WUPI and the data signal are both included in an orthogonal frequency division multiplexing (OFDM) waveform.

27. The first wireless communication device of claim 26, wherein the first receiver is a lower power receiver than the second receiver.

28. The first wireless communication device of claim 26, wherein the first receiver is further configured to:
receive, from the second wireless communication device, an allocation of a set of channel resources, the determination being between transmitting the WUPI using the set of channel resources and the signal using the set of channel resources and the signal, and wherein the signal comprises a data signal, and
monitor the set of channel resources for the WUPI.

29. The first wireless communication device of claim 26, wherein:
the first receiver is further configured to receive from the second wireless communication device a unique code, the WUPI being encoded with the unique code, and
the processor is further configured to decode the WUPI using the received unique code.

30. The first wireless communication device of claim 26, wherein:
the first receiver is further configured to receive from the second wireless communication device a common code, the WUPI being encoded with the common code, and
the processor is further configured to decode the WUPI using the received common code.

* * * * *